United States Patent [19]
Gibbons et al.

[11] Patent Number: 5,605,726
[45] Date of Patent: Feb. 25, 1997

[54] ORGANOSILICON POLYMERS, AND DYES, EXHIBITING NONLINEAR OPTICAL RESPONSE

[75] Inventors: Wayne M. Gibbons, Bear; Robert P. Grasso, Wilmington, both of Del.; Michael K. O'Brien, Berwyn; Paul J. Shannon, Exton, both of Pa.; Shao-Tang Sun, Newark, Del.

[73] Assignee: Hercules Incorporated, Wilmington, Del.

[21] Appl. No.: 460,616

[22] Filed: Jun. 2, 1995

Related U.S. Application Data

[62] Division of Ser. No. 192,900, Feb. 7, 1994, which is a division of Ser. No. 96,389, Jul. 26, 1993, Pat. No. 5,298,588, which is a division of Ser. No. 831,609, Feb. 5, 1992, Pat. No. 5,254,655.

[51] Int. Cl.$^6$ ............................................. B32B 25/20
[52] U.S. Cl. ................................. 428/1; 428/447; 528/15; 528/31; 528/28; 528/25; 525/478
[58] Field of Search .............................. 428/1, 447; 528/15, 528/28, 25, 31; 525/478

[56] References Cited

U.S. PATENT DOCUMENTS

| | | | |
|---|---|---|---|
| 3,197,432 | 7/1965 | Lamoreaux | 260/46.5 |
| 3,197,433 | 7/1965 | Lamoreaux | 260/46.5 |
| 4,011,247 | 3/1977 | Sato et al. | 260/348 SC |
| 4,358,391 | 11/1982 | Finkelmann et al. | 252/299.01 |
| 4,410,570 | 10/1983 | Kreuzer et al. | 427/374.1 |
| 4,504,645 | 3/1985 | Melancon | 528/15 |
| 4,640,968 | 2/1987 | Watanabe et al. | 528/32 |
| 4,694,066 | 9/1987 | DeMartino et al. | 528/373 |
| 4,698,386 | 10/1987 | Fujimoto | 524/862 |
| 4,707,303 | 11/1987 | Buckley et al. | 252/583 |
| 4,717,508 | 1/1988 | DeMartino | 252/583 |
| 4,719,281 | 1/1988 | Choe | 528/310 |
| 4,720,335 | 1/1988 | Fukushima et al. | 204/424 |
| 4,774,025 | 9/1988 | Choe et al. | 252/582 |
| 4,779,961 | 10/1988 | DeMartino | 350/350 R |
| 4,795,664 | 1/1989 | DeMartino | 428/1 |
| 4,796,971 | 1/1989 | Robello et al. | 350/96.34 |
| 4,801,659 | 1/1989 | Leslie | 525/479 |
| 4,801,670 | 1/1989 | DeMartino et al. | 526/263 |
| 4,808,332 | 2/1989 | DeMartino et al. | 526/263 |
| 4,822,865 | 4/1989 | DeMartino et al. | 526/292.2 |
| 4,867,538 | 9/1989 | Yoon et al. | 350/350 R |
| 4,877,820 | 11/1989 | Cowan | 528/222 |
| 4,886,339 | 12/1989 | Scozzafava et al. | 350/96.34 |
| 4,887,889 | 12/1989 | Leslie et al. | 350/311 |
| 4,892,682 | 1/1990 | DeMartino et al. | 252/589 |
| 4,898,691 | 2/1990 | Borzo et al. | 252/589 |
| 4,900,127 | 2/1990 | Robello et al. | 350/96.34 |
| 4,900,779 | 2/1990 | Leibfried | 524/862 |
| 4,902,731 | 2/1990 | Leibfried | 523/222 |
| 4,913,836 | 4/1990 | East | 252/299.01 |
| 4,913,844 | 4/1990 | DeMartino | 252/582 |
| 4,915,491 | 4/1990 | DeMartino et al. | 350/330 |
| 4,922,003 | 5/1990 | DeMartino et al. | 560/221 |
| 4,935,292 | 6/1990 | Marks et al. | 428/220 |
| 4,938,896 | 7/1990 | Choe et al. | 252/587 |
| 4,944,896 | 7/1990 | DeMartino et al. | 252/587 |
| 4,946,629 | 8/1990 | Allen et al. | 252/589 |
| 4,948,532 | 8/1990 | DeMartino et al. | 252/587 |
| 4,954,288 | 9/1990 | East | 252/299.01 |
| 4,957,655 | 9/1990 | Khanarian et al. | 252/299.01 |
| 4,959,448 | 9/1990 | Wreesmann et al. | 528/192 |
| 4,962,160 | 10/1990 | DeMartino et al. | 525/404 |
| 4,966,730 | 10/1990 | Clement et al. | 252/589 |
| 4,973,429 | 11/1990 | Decher et al. | 252/587 |
| 4,981,607 | 1/1991 | Okawa et al. | 252/299.01 |
| 4,983,325 | 1/1991 | Choe et al. | 252/600 |
| 4,985,528 | 1/1991 | Mignami et al. | 528/59 |
| 4,997,595 | 3/1991 | Kurihara et al. | 252/587 |
| 4,999,139 | 3/1991 | Kurihara et al. | 252/587 |
| 5,001,209 | 3/1991 | Wreesmann et al. | 528/70 |
| 5,002,361 | 3/1991 | DeMartino et al. | 350/96.34 |
| 5,008,360 | 4/1991 | Bard et al. | 528/25 |
| 5,013,809 | 5/1991 | Leibfreid, Sr. | 524/862 |
| 5,025,048 | 6/1991 | Burnier | 524/99 |
| 5,068,303 | 11/1991 | Bard et al. | 528/25 |
| 5,077,134 | 12/1991 | Leibfried | 428/447 |
| 5,098,978 | 3/1992 | Riepl et al. | 525/15 |
| 5,254,655 | 10/1993 | Gibbons et al. | 528/15 |

FOREIGN PATENT DOCUMENTS

| | | |
|---|---|---|
| 202542 | 11/1986 | European Pat. Off. . |
| 359795 | 9/1989 | European Pat. Off. . |
| 431466 | 6/1991 | European Pat. Off. . |
| 431466A2 | 6/1991 | European Pat. Off. . |
| 406888 | 9/1991 | European Pat. Off. . |
| 1278532 | 11/1989 | Japan . |
| 2221938 | 9/1990 | Japan . |
| 9009616 | 8/1990 | WIPO . |

OTHER PUBLICATIONS

Abstract, JP 60031565 A2, 18 Feb. 1985.
Abstract, Kostyukov et al, "Synthesis of allyl derivatives of azo dyes and their capacity for copolymerization with vinyl monomers", 1974.
Risse, et al, Di–and Tetrafunctional Initiators for the Living Pins–Opening Olefin Metathesis Polymerization of Strained Cyclic Olefins, *Macromolecules*, 1989, vol. 22, No. 8.
Reck et al, "Crosslinked Epoxy Polymers with Large and Stable Non–Linear Optical Susceptibilities" SPIE vol. 1147, *Non–Linear Optical Properties of Organic Materials II*, 1989 (pp. 74–83).

(List continued on next page.)

*Primary Examiner*—Margaret W. Glass
*Attorney, Agent, or Firm*—Vidas, Arrett & Steinkraus, P.A.

[57] ABSTRACT

Organosilicon polymers, including crosslinked polymers and crosslinkable prepolymers, of cyclic polysiloxanes, organic dyes, and, optionally, polyenes. The dyes include those with delocalized Pi electron systems linking electron donor groups and electron acceptor groups, and with at least two carbon-carbon double bond-containing pendant groups attached to at least two different sites from among the indicated delocalized Pi electron systems, donor groups, and acceptor groups. Also disclosed are optical substrates coated with the organosilicon crosslinked polymers exhibiting second order non-linear optical susceptibility.

3 Claims, No Drawings

OTHER PUBLICATIONS

Jungbauer et al, "Highly Efficient and Stable Nonlinear Optical Polymers Via Chemical Crosslinking Under Electric Field" *Appl. Phys. Lett.*, vol. 56, No. 26, 25 Jun. 1990 (pp. 2610–2612).

Hubbard et al, "Poled Polymeric Nonlinear Optical Materials. Enhanced Second Harmonic Generation Stability of Crosslinkable Matrix/Chromophere Essemblies," *Chemistry of Materials*, vol. 1, No. 2, Mar./Apr. 1980 (pp. 167–169).

Teraoka et al, "Stability of Nonlinear Optical Characteristcs and Dielectric Relaxations of Poled Amorphous Polymers with Main–Chain Chromophores," *J. Appl. Phys.* 64(4), 15 Feb. 1991 (pp. 2568–2576).

Eich et al, "Novel Second Order Nonlinear Optical Polyumers Via Chemical Cross–linking–induced Vitrification under Electric Field" *J. Appl. Phys.* 66(7), 1 Oct. 1989 (pp. 3241–3243).

Dai et al, "Rational Design and Construction of Polymers with Large Second Order Optical Nonlinearities. Synthetic Strategies for Enhanced Chromophore Number Densities and Frequency Doubling Temporal Stabilities" *Mol. Cryst. Liq. Cryst.*, 1990, vol. 189 (pp. 93–106).

Eich, et al "Poled Amorphous Polyumers for Second–Order Nonlinear Optics", *Polymers for Advanced Technologies*, 1990, vol. 1 (pp. 189–198).

Kasahara et al. *Chemical Abstracts*, vol. 106, 1987, 156217u.

Strantzalis et al., *Polymer Bulletin*, "Synthesis of 4–Chloro–3–Nitrostyrene", vol. 15, Springer–Verlag, 1986, pp. 431–438.

Danishefsky et al., *Tetrahedron Letters*, "A Rapid Route to Ergot Precursors Via Aza–Claisen Rearrangement", vol. 25, No. 30, Pergamon Press, Great Britian, 1984, pp. 3159–3162.

ORGANOSILICON POLYMERS, AND DYES, EXHIBITING NONLINEAR OPTICAL RESPONSE

This application is a division of application Ser. No. 08/192,900, filed Feb. 7, 1994, which is a division of application Ser. No. 08/096,389 filed Jul. 26, 1993, which issued as U.S. Pat. No. 5,298,588 on Mar. 29, 1994, which is a division of application Ser. No. 07/831,609 filed Feb. 5, 1992, which issued as U.S. Pat. No. 5,254,655 on Oct. 19, 1993, all of which are incorporated herein by reference.

BACKGROUND OF THE INVENTION

1. Field of the Invention

The present invention pertains to novel organosilicon compositions, e.g., polymers—both crosslinked organosilicon polymers and crosslinkable prepolymers—and to novel nonlinearly optically active dyes. The present invention further relates to novel nonlinearly optically active media, and to novel optical articles, comprising these polymers and dyes, as well as to novel processes for preparing these polymers, dyes, media, and optical articles.

2. Background Information

The significant polarization components of a medium produced by contact with an electro-magnetic field are first order polarization (linear polarization), second order polarization, and third order polarization. On a molecular level, the polarization response (p) of a molecule to the incident electric field (E) can be expressed by the following equation:

$$p = \alpha E + \beta : EE + \gamma \vdots EEE + \ldots$$

wherein $\alpha$ is the polarizability, $\beta$ and $\gamma$ are first and second hyperpolarizabilities, p is the total induced polarization, and E is the local electric field created by an applied electric field. The coefficients in this equation—i.e., $\alpha$, $\beta$, etc.—are tensor quantities intrinsic to the molecule under consideration.

For a macroscopic ensemble of molecules, corresponding relationships may be expressed by the following equation:

$$P = \epsilon_0 X^{(1)} \cdot E + \epsilon_0 X^{(2)} : EE + \epsilon_0 X^{(3)} \vdots EEE + \ldots$$

wherein $X^{(1)}$, $X^{(2)}$ and $X^{(3)}$ are the first, second, and third order polarization susceptibilities of the electromagnetic wave transmission medium, $\epsilon_0$ is the permittivity in vacuum, P is the total induced polarization, and E is the local field created by an applied electric field.

The coefficients $X^{(1)}$, $X^{(2)}$, and $X^{(3)}$ are analogous to $\alpha$, $\beta$, and $\gamma$, except for the fact that they describe a macroscopic assembly of molecules. On both the molecular and the macroscopic levels, the nonlinear optical properties arise from the coefficients for nonlinear polarization—i.e., $\beta$ and $\gamma$ at the molecular level, and $X^{(2)}$ and $X^{(3)}$ at the macroscopic level; a significant aspect of this invention pertains to those properties emanating from $\beta$:EE or $X^{(2)}$:EE, which properties are the second order polarization effects.

For second order polarization of a molecule to be of significant magnitude, it is necessary that the first hyperpolarizability ($\beta$) be large. A molecule must be non-centrosymmetric for it to possess a nonzero value for $\beta$. A large $\beta$ value is achieved when the molecule exhibits a large difference between ground state and excited state dipole moments, and a large oscillator strength.

In addition to the foregoing requirement on the molecular level, there is an additional symmetry constraint for macroscopic assemblies; a non-zero $X^{(2)}$ requires a non-centrosymmetric arrangement of the ensemble of molecules. If the symmetry of the charge transfer molecules is broken—i.e., the molecules are arranged so that the dipoles are unidirectionally aligned along one axis—and if this induced order is frozen into place by some means—for example, a polymer matrix, a crystal lattice, etc.—then the macroscopic assembly is capable of interacting with electro-magnetic waves in such a manner so as to alter the optical properties of the wave—e.g., frequency doubling—and/or the physical properties of the macroscopic assembly—e.g., refractive index changes. These second order nonlinear optical phenomena can be exploited in optoelectronic devices, such as optical switches, phase modulators, amplifiers, and frequency doublers.

Efforts have recently been focused on obtaining efficient second-order nonlinear optical (NLO) properties from poled amorphous polymers. The use of organic polymeric materials offers several advantages over inorganic and crystalline materials. For instance, it is easier to manufacture thin films (e.g., having micrometer thicknesses) of polymer materials onto a variety of substrates for integrated optics applications. An important use of such polymeric thin films incorporates active optical interconnection systems with existing semiconductor electronic technology. This application requires that thin films of the active optical material be deposited onto semiconductor substrates with active semiconductor chips. Crystalline materials, if used in this application, would need controlled methods of growing crystals in the proper molecular orientation and thickness. As a result, the methods of generating these crystalline thin films (e.g., crystallization, molecular organic chemical vapor deposition, liquid phase epitaxy, molecular beam epitaxy) would be time consuming. In contrast, the polymeric thin films are relatively easy to make, using techniques compatible with existing semiconductor processing (i.e., photolithography).

Also to be considered is the nature of the particular component supplying the nonlinear optical response. High nonlinearities, which can exceed those of state of the art inorganics such as lithium niobate, have already been realized in organic dye systems. Because the predominate source of nonlinear optical (i.e., NLO) response of an organic molecule is the polarization of easily perturbed Pi electrons, organic based devices should be able to operate at higher operating frequencies than their inorganic based analogues.

There are four general categories of nonlinear optical media which comprise polymers and organic dyes, both as previously discussed. These are guest/host mixtures, guest/crosslinked host mixtures, polymer bound dyes, and crosslinked polymer bound dyes.

As to these four categories, those systems wherein the nonlinearly optically active organic dye is doped into a linear or crosslinked polymer matrix—i.e., guest/host systems—can achieve high nonlinearities. However, they may be less desirable because there is a time and temperature dependent relaxation of the induced alignment achieved during the poling process; this factor may result in lowered nonlinear optical signals. In addition, high loading of dye in the polymer matrix may be difficult to achieve because of insolubility and phase separation.

Regarding the distinction between these four categories, in guest/host mixtures, the polymer acts simply as a matrix for dissolved dye molecules. In guest/crosslinked host mixtures, the polymer is crosslinked in the presence of a guest dye molecule.

In contrast, a method of generating nonlinearly optically active materials, wherein the dyes may be more permanently aligned, is to covalently bond such dyes into a polymeric matrix.

The polymer bound dyes comprise nonlinear optically active organic dyes covalently bonded to the polymeric chains, either as side groups, or within the backbone itself. In particular, such systems using organosilicon polymers are known in the art.

For instance, FINKELMANN et al., U.S. Pat. No. 4,358,391, CHOE '281, U.S. Pat. No. 4,719,281, LESLIE '659, U.S. Pat. No. 4,801,659, and LESLIE '889, U.S. Pat. No. 4,887,889, all disclose linear polysiloxanes with pendant organic dyes. CHOE '281 additionally discloses the formation of a crosslinked ladder polymer by hydrolysis of a bis(diethoxymethylsilylpropylamine) containing a pendant organic dye.

European Patent Application No. 431,466 discloses cyclic polysiloxanes with pendant NLO organic dyes, and KREUZER et al., U.S. Pat. No. 4,410,570, discloses cyclic polysiloxanes containing mesogenic moieties which exhibit liquid crystalline properties. FUJIMOTO, U.S. Pat. No. 4,698,386, discloses compositions comprising linear and branched polyorganosiloxanes, and dissolved anthraquinone and azo dyes which act as color indicators of curing state. European Patent Application 406,888 discloses a thermosetting silicone resin (polydiphenylsiloxane) containing a guest (not covalently bonded) NLO dye.

Also known in the art are organosilicon polymers which are the hydrosilation product of siloxanes and bicyclic diolefins; further, these resins have been shown to exhibit excellent thermal and electrical properties. For instance, LEIBFRIED '779, U.S. Pat. No. 4,900,779, discloses polymers prepared from reacting polycyclic polyenes, having at least two non-aromatic carbon-carbon double bonds in their rings, with cyclic polysiloxanes and tetrahedral siloxysilanes, having at least two ≡SiH groups. The thermoset polymers, as disclosed in LEIBFRIED '779, can have glass transition temperatures of about 200° C., and less than 10% weight loss at 500° C. during thermogravimetric analysis; these polymers are also insensitive to water, and resistant to both oxidation and ultraviolet radiation.

It has been discovered that cyclic polysiloxanes with at least two ≡SiH groups can undergo hydrosilation with organic dyes having at least two carbon-carbon double bonds—or, optionally, with organic dyes having at least one carbon-carbon double bond and polyenes having at least two non-aromatic carbon-carbon double bonds. It has further been discovered that organosilicon crosslinkable prepolymers and crosslinked polymers can be obtained from this reaction, and that the latter, where the dye components thereof have been sufficiently aligned, exhibit highly stable nonlinear optical properties.

It has also been discovered that, as to organic dyes comprising an electron donor group, an electron acceptor group, and a delocalized Pi electron system linking these groups, such dyes can be obtained having at least two carbon-carbon double bonds pending from two different of these three sites.

SUMMARY OF THE INVENTION

An aspect of the present invention pertains to organosilicon crosslinked polymers and crosslinkable prepolymers. These are the hydrosilation products of at least one cyclic polysiloxane having at least two hydrosilation reactive ≡SiH groups, at least one organic dye having an absorption maximum between 300 and 2000 nm, an extinction coefficient, at the absorption maximum, greater than $2 \times 10^3$ L/mol cm, and at least one hydrosilation reactive carbon-carbon double bond, and, optionally, at least one polyene having at least two hydrosilation reactive carbon-carbon double bonds.

Where the indicated at least one polyene is not present, the at least one organic dye will have at least two such carbon-carbon double bonds. Moreover, at least one of the at least one cyclic polysiloxane, the at least one organic dye, and—when present—the at least one polyene has more than two hydrosilation reactive sites.

The invention further relates to processes for preparing organosilicon crosslinked polymers and crosslinkable prepolymers, comprising reacting the indicated at least one cyclic polysiloxane, at least one organic dye, and, optionally, at least one polyene, in the presence of a hydrosilation catalyst. Where the crosslinkable prepolymer is desired, the processes of the invention are conducted so that these reactants are partially reacted—i.e., to the point where about 5% to about 80% of the hydrosilation reactive ≡SiH groups provided by the at least one cyclic polysiloxane have been reacted.

As a preferred embodiment of the processes of the invention—particularly where the at least one polyene is absent—at least two of the at least two hydrosilation reactive carbon-carbon double bonds of the at least one organic dye are of differing hydrosilation activity. Further, of these bonds, those having the greater reactivity are reacted to the substantial exclusion of such bonds having the lesser reactivity.

In another preferred embodiment of the processes of the invention—i.e., where the at least one polyene is present—at least two of the at least two hydrosilation reactive carbon-carbon double bonds, of the at least one polyene, are of differing hydrosilation activity. As with respect to the at least one organic dye in the embodiment discussed immediately above, these bonds of the at least one polyene are also such that the bonds of greater reactivity are reacted to the substantial exclusion of those with the lesser reactivity.

The media of the invention exhibit nonlinear optical response—preferably, second order nonlinear optical response is exhibited thereby. These media can be in the form of films; specifically, a medium of the invention comprises the organosilicon crosslinked polymer as previously discussed—i.e., comprising the indicated at least one cyclic polysiloxane, at least one organic dye, and, optionally, at least one polyene, all having their respective reactive sites, also as earlier described.

The invention further encompasses optical articles. Such an optical article comprises a substrate, and, coating the substrate, a film comprising a medium of the invention, as previously discussed.

The invention yet further encompasses processes for preparing these optical articles. Such a process of the invention comprises coating a substrate with a prepolymer of the invention, and curing this prepolymer to obtain an organosilicon crosslinked polymer. In addition to this curing step, the initial crosslinkable prepolymer, or the finished crosslinked polymer, may also be treated so that sufficient organic dye alignment is imparted thereto, to effect a second order nonlinear optical response therein; such treatment may, for instance, be imparted to the partially cured prepolymer, with cure then being completed, or to the prepolymer simultaneously with the curing step.

The invention further pertains to organic dyes which comprise an electron donor group, an electron acceptor group, and a delocalized Pi electron system linking these groups. Such organic dyes further include at least two pendant groups, each comprising at least one carbon-carbon double bond; further, these at least two pendant groups are covalently linked to two different sites from among the indicated electron donor group, electron acceptor group, and intermediate delocalized Pi electron system.

DETAILED DESCRIPTION OF THE INVENTION

1. Definitions

Herein, "SiH" is used to describe hydrosilation reactive ≡SiH groups. These are also referred to herein as silylhydrides.

The term "electron donor group," as used herein, refers to organic substituents which can contribute electron density to the Pi electron system when the conjugated moiety is polarized via incident electro-magnetic radiation.

The term "electron acceptor group," as used herein, refers to electronegative organic substituents which can attract electron density from the Pi electron system when the conjugated moiety is polarized via incident electro-magnetic radiation.

The term "heteroaryl," as used herein, refers to heterocyclic compounds with ring conjugation, in the manner of the aryl compounds.

The term "polyene," as used herein, refers to molecules having at least two carbon-carbon double bonds.

The term "molecule," as used herein, particularly in conjunction with the term "polyene," encompasses both polymers and low molecular weight compounds.

The term "fused polycyclic polyene," as used herein, refers to polyenes which are hydrocarbon compounds containing at least two cycloaliphatic carbon atom rings, with at least one carbon atom being shared by at least two of the indicated carbon atom rings.

The term "polymer," as used herein, may encompass prepolymers, such as crosslinkable prepolymers, and polymers, such as crosslinked polymers.

The term "prepolymer," as used herein, refers to any viscous liquid or solid hydrosilation crosslinkable composition that has been partially cured, but has not been cured up to or beyond .its gel point (gel point is the point which a material will no longer flow when heated, and is no longer soluble in organic solvents); typically, having 5% 80% of the available SiH groups reacted.

The term "fully formulated" is used herein to refer prepolymers wherein, as to the hydrosilation reactive carbon-carbon double bonds and the hydrosilation reactive ≡SiH groups, the ratio of such bonds to such groups which have been contributed to the prepolymer, is not subjected to any further modification—or at least to any significant degree of further modification—by the activity of any additional reactants. Such additional reactants include polyene, dye, and cyclic polysiloxane.

The term "differing hydrosilation reactivity," used herein with reference to hydrosilation reactive carbon-carbon double bonds, means having different rates of reaction in hydrosilation. As to the bonds to which this term is applied, those which are more hydrosilation reactive will react before substantial reaction of the less hydrosilation reactive bonds.

The term "substrate," as used herein, includes those materials commonly used in the art as supports for nonlinearly optically active films. Examples of these materials include glass, particularly optical glass, indium tin oxide (ITO) coated glass, and semiconductor wafers.

The term "optical article," as used herein, refers to substrates bearing films which are nonlinearly optically active, i.e., exhibit nonlinear optical response.

2. Cyclic Polysiloxanes

The cyclic polysiloxanes suitable for the invention are those having two or more hydrogen atoms bound to silicon—particularly, at least two hydrosilation reactive ≡SiH groups —and include the cyclic polysiloxanes disclosed in LEIBFRIED '779, U.S. Pat. No. 4,900,779, LEIBFRIED '731, U.S. Pat. No. 4,902,731, and BARD et al. '360, U.S. Pat. No. 5,008,360; these patents are incorporated herein in their entireties, by reference thereto. Appropriate cyclic polysiloxanes include those having the general formula:

wherein R, which can be the same or different, is hydrogen, or a saturated, substituted, or unsubstituted alkyl radical, or a substituted or unsubstituted aromatic radical, n is an integer from 2 to about 20—preferably, 3 to 7—and R is hydrogen on at least two of the silicon atoms.

In the indicated formula (I), R is preferably methyl, phenyl, or hydrogen. Most preferably, R is methyl or hydrogen.

Of such compounds, the methylhydrocyclosiloxanes (hereafter MHCS), and mixtures thereof, are suitable. Examples include, e.g., tri-, tetra-, penta- and hexamethylcyclotetrasiloxanes; tetra-, penta-, hexa-, heptamethylcyclopentasiloxanes; and tetra-, penta-, hexamethylcyclohexasiloxanes. Higher alkyl homologs are also suitable. Examples include, e.g., tetraethylcyclotetrasiloxane and tetraoctylcyclotetrasiloxane. Aromatic substituted cyclicsiloxanes are also suitable. Examples include, e.g., tetraphenylcyclotetrasiloxane and 1,5-diphenyl-3,7-dimethylcyclotetrasiloxane. Preferred are 1,3,5,7,-tetramethylcyclotetrasiloxane, 1,3,5,7,9-pentamethylcyclopentasiloxane and 1,3,5,7,9,11-hexamethylcyclohexasiloxane, or blends thereof. In most cases, what is used is indeed a mixture of a number of species wherein n can vary widely, and reference hereinafter to MHCS can refer to such a mixture. Generally, commercial MHCS mixtures contain up to about 20% (in purer forms, as low as 2%) low molecular weight linear methylhydrosiloxanes, such as heptamethyltrisiloxane, octamethyltrisiloxane, etc. One suitable commercial mixture is Huls M8830 MHCS (Huls America, formerly Petrarch, Bristol, Pa.).

3. Dyes

Organic dyes appropriate for the polymers of the invention include those having at least one hydrosilation reactive carbon-carbon double bond, absorption maxima between 300 and 2000 nm—or, more particularly, between 300 and 700 nm—and extinction coefficients, at the absorption maxima, greater than about $2 \times 10^3$ L/mol cm. Two or more organic dyes can be used in combination.

Preferred moleties for providing hydrosilation reactive carbon-carbon double bonds are pendant alkenyl chains—particularly those where the carbon-carbon unsaturated bond is in the terminal position—and strained endocyclic bicycloalkenyl groups, because these carbon-carbon double bonds are highly reactive for hydrosilation. Suitable such alkenyl chains are the vinyl, allyl, and 3-butenyl groups; appropriate strained endocyclic bicycloalkenyl moieties include the 5-norbornenyl and 5-bicyclo[2,2,2]-octenyl groups.

Particularly suitable dyes are those including an electron donor group, an electron acceptor group, and a delocalized Pi electron system linking these two groups—especially where the combination of these groups exhibits an NLO response.

Appropriate electron donor groups include the hydroxy, alkoxy, acyloxy, alkyl, amino, thioalkoxy and dithiolylidene groups; the halogen substituents —Cl, —Br, and —I are also suitable. Of these, the hydroxy, alkoxy, amino, thioalkoxy and dithiolylidene groups, and the indicated halogen substituents, are preferred. More preferred are the amino groups, especially tertiary amino groups having two alkyl groups attached to the amine nitrogen.

Similarly appropriate electron acceptor groups include the sulfonyl, alkoxycarbonyl, alkoxysulfonyl, acyl, nitro, 2-nitrovinyl, cyano, 2-cyanovinyl, 2,2-dicyanovinyl, tricyanovinyl, and perfluoroalkyls including trifluoromethyl and trifluoromethylsulfonyl groups. Of these, nitro, dicyanovinyl, tricyanovinyl, sulfonyl, and perfluoroalkyl groups are preferred.

Especially preferred are such dyes wherein:

(a) the electron donor group has the formula:

wherein:
  (i) $R_{14}$ and $R_{15}$ may be the same or different, and each comprises a member selected from the group consisting of $CH_2=CH-(CH_2)_m-$, $CH_2=C(R_{16})-CO_2(CH_2)_m-$, $C_1-C_{10}$ alkyl, 2-cyclopentenyl, 3-cyclopentenyl, 2-cyclohexenyl, and 3-cyclohexenyl;
  (ii) $R_{16}$ comprises a member selected from the group consisting of H and $C_1-C_4$ alkyl groups; and
  (iii) m=1–10; and (b) the electron acceptor group comprises a member selected from the group consisting of $—NO_2$, $—CN$, $—CH=CH—NO_2$, $—CH=CH—CN$, $—CH=C(CN)_2$, $—C(CN)=C(CN)_2$, $—SO_2R_{14}$, $—CO_2R_{14}$, $—SO_3R_{14}$, $—CF_3$, and $—SO_2CF_3$.

Preferably, the dyes incorporated in the polymers of the invention are characterized by such electron donor group/electron acceptor group/delocalized Pi electron system configurations. Particularly preferred of these are the aryl and heteroaryl dyes, the azo, bis(azo), tris(azo), tetra(azo) and penta(azo) dyes, the stilbene, bis(stilbene), and tris(stilbene) dyes, the azomethine and azostilbene dyes, the quinone and anthraquinone dyes, and the polymethine dyes generally referred to as neutrocyanine dyes, examples of which are the flavanoids, the coumarins, the indophenols, the indoanilines, the phenazones, the phenothiazones, and the phenoxazones. Further included among the preferred dyes are the diphenoquinodimethane dyes, as disclosed in CHOE et al. '325, U.S. Pat. No. 4,983,325, the quinodimethane dyes, as disclosed in CHOE '281, the naphthoquinodimethanes, as disclosed in CHOE et al. '025, U.S. Pat. No. 4,774,025, the pyrenoquinodimethanes, as disclosed in FUKUSHIMA et al., U.S. Pat. No. 4,720,355, and the polymethine dyes derived from the condensation of aromatic aldehydes with isophorone and malononitrile, as disclosed in European Patent Application No. 359,648; CHOE et al. '325, CHOE et al. '025, FUKUSHIMA et al., and European Patent Application No. 359,648 are incorporated herein in their entireties, by reference thereto.

Preferred aryl and heteroaryl dyes are the phenyl, biphenyl, naphthyl, anthracyl, and pyridinyl dyes, as well as the 2,3-dihydroperimidines, thiazoles, pyrazoles, benzthiazoles, isothiazoles, imidazoles, and pyrroles.

Of the aryl dyes, specific examples of preferred substituted phenyl dyes are N-allyl-N-methyl-4-nitroaniline; N,N-diallyl-4-nitroaniline; N-allyl-N-methyl-4-tricyanovinylaniline, and N, N-diallyl-4-tricyanovinylaniline.

Preferred examples of the azo and bis(azo) dyes include N,N-diallyl-4-(4'-nitrophenylazo)-3-methylaniline, and N,N-diallyl-4-[4'-(4"-nitrophenylazo)-3-methylphenylazo] aniline. 4-(N,N-diallylamino)-4'-nitrostilbene is an example of a preferred dye among the stilbenes.

The organic dyes of the polymers of the invention are preferably nonionic. Such dyes are advantageous, because they tend to be more soluble than ionic dyes in the cyclic polysiloxanes of the invention. Nonionic dyes also exhibit lower conductivities in polymeric matrices than ionic dyes; yet further, such nonionic dyes, or at least certain of these, are less susceptible to dielectric breakdown than ionic dyes.

It is emphasized that the dyes discussed herein are provided as representative examples. The invention is not to be construed as being limited to those dyes which are particularly disclosed.

In accordance with the previous disclosure, the dyes of the invention can have just one hydrosilation reactive carbon-carbon double bond. Indeed, two of the preferred dyes previously specified—i.e., N-allyl-N-methyl-4-nitroaniline, and N-allyl-N-methyl-4-tricyanovinylaniline—have one such carbon-carbon double bond, while the remainder have two.

However, where the dyes have two or more such carbon-carbon double bonds, polymerization can be effected between such dyes and the cyclic polysiloxanes, without requiring the polyenes, as subsequently discussed herein. However, inclusion both of dyes with a plurality of carbon-carbon double bonds, and of polyenes, is within the scope of the invention.

Of such dyes having at least two hydrosilation reactive carbon-carbon double bonds, these bonds can be of differing hydrosilation reactivity. Highly hydrosilation reactive carbon-carbon double bonds are discussed herein; moieties having carbon-carbon double bonds which are less reactive to hydrosilation include the methacrylate, cyclopentenyl, cyclohexenyl, and styryl groups. Examples of specific dyes having such carbon-carbon double bonds of different hydrosilation reactivity are N-allyl-N-(2-methacryloyloxyethyl)-4-nitrobenzenamine and N-allyl-N-(2-methacryloyloxyethyl)-4-(4'-nitrophenylazo) benzenamine.

Table 1, provided below, shows the structures for the previously specified examples of preferred substituted phenyl, azo and bis(azo), and stilbene dyes, and examples of dyes having carbon-carbon double bonds of different hydrosilation reactivity. The Examples in this application, including those set forth in Table 1 below, are provided for the purpose of representation, and are not to be construed as limiting the scope of the invention.

TABLE 1
| Example | Dye | Structure |
|---|---|---|
| 1 | N-allyl-N-methyl-4-nitroaniline | 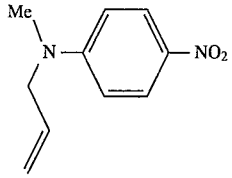 |
| 2 | N,N-diallyl-4-nitroaniline | 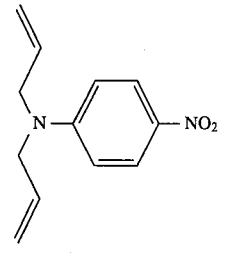 |
| 3 | N-allyl-N-methyl-4-tricyanovinylaniline | 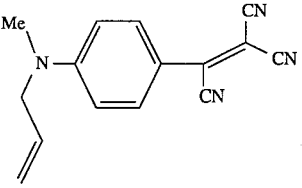 |
| 4 | N,N-diallyl-4-tricyanovinylaniline | 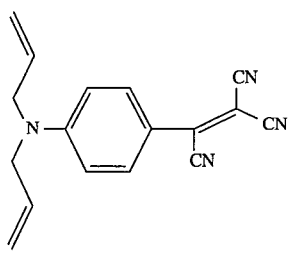 |
| 5 | N,N-diallyl-4-(4'-nitrophenylazo)-3-methylaniline | 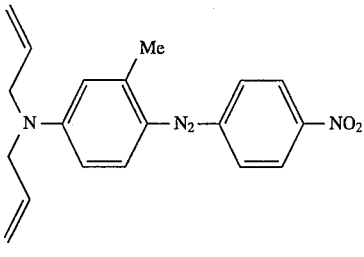 |
| 6 | N,N-diallyl-4-[4'-(4''-nitrophenylazo)-3-methylphenylazo]aniline | 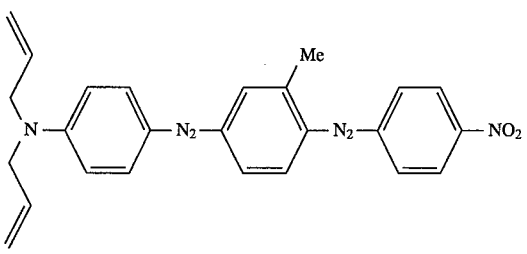 |

TABLE 1-continued

| Example | Dye | Structure |
|---------|-----|-----------|
| 7 | 4-(N,N-diallylamino)-4'-nitrostilbene | (structure) |
| 8 | N-allyl-N-(2-methacryloyloxyethyl)-4-nitrobenzenamine | (structure) |
| 9 | N-allyl-N-(2-methacryloyloxyethyl)-4-(4'-nitrophenylazo)benzenamine | (structure) |

The dyes of the foregoing Examples were prepared according to the synthesis procedures as set forth hereinafter; as indicated with respect to the Examples included in this application, the synthesis procedures set forth in this application are also provided for the purpose of representation, and are not to be construed as limiting the scope of the invention. Unless stated otherwise, all percentages are by weight.

EXAMPLE 1

A mixture of p-fluoronitrobenzene (2.8 g, 20 mmol), N-methylallylamine (2.10 g, 30 mmol), triethylamine (2.0 g, 20 mmol), and N-methyl-2-pyrrolidinone (NMP) (20 ml) was heated to 60°–70° C. for 5 hours in an oil bath. The mixture was diluted with distilled water (100 ml) and extracted twice with ether. The extracts were washed with distilled water and brine solution, dried over potassium carbonate and concentrated to an oil. The oil was distilled via Kugelrohr apparatus (forecut taken up to 90° C. discarded, 110°–125° C., 0.1 mm Hg) to give 3.70 g (96%) N-allyl-N-methyl-4-nitroaniline. As is, this material failed to undergo clean hydrosilation, possibly due to residual N-methyl-2-pyrrolidinone present. The remaining material was chromatographed on silica with hexane-ethyl acetate (10:1) and distilled again via Kugelrohr apparatus to give a yellow oil that underwent clean hydrosilation.

EXAMPLE 2

A mixture of p-fluoronitrobenzene (15.2 g, 0.11 mol), diallylamine (10.7. g, 0.11 mol), triethylamine (15.3 ml, 0.11 mol) and NMP (20 ml) was heated under a nitrogen atmosphere to 90°–100° C. for 17 hours in an oil bath. The mixture was cooled, diluted with distilled water (200 ml) and extracted with ether-tetrahydrofuran (2:1). The extracts were washed with distilled water twice, dried over magnesium sulfate, and concentrated to a yellow oil. The mixture was chromatographed on silica with hexane-ethyl acetate (12:1) and the product distilled via Kugelrohr apparatus at 120°–140° C. (0.1 mm Hg) to give a yellow oil (8.9 g, 56%).

EXAMPLE 3

This synthesis procedure includes the preparation of a precursor, N-allyl-N-methylaniline, as well as of the dye.

N-Methylaniline (10.1 ml, 0.09 mol) and allyl bromide (12.1 ml, 0.14 mol) were added to 100 ml of NMP in a 250 ml round bottomed flask. The flask was fitted with a condenser, and refluxed for 16 hours. After cooling the reaction mixture, the pH was adjusted to 7.0 with 1.5 N NaOH. The organics were extracted with diethyl ether and washed with distilled water. After drying over anhydrous magnesium sulphate and filtering, the solution was concentrated in vacuo to yield 13.3 g as a viscous yellow oil. Vacuum distillation at 17 mm Hg (99°–109° C.) yielded 10 ml of pure product as a colorless oil. This material was used in the next step.

N-Allyl-N-methylaniline (3.0 g, 0.02 mol) was dissolved in 30 ml of pyridine in a 100 ml round bottomed flask. After cooling to 0° C., tetracyanoethylene (3.07 g, 24 mmol) was added in small portions. After addition of the TCNE, the red solution was stirred for 15 minutes at 0° C. and 15 minutes at 50°–60° C. The solution was again cooled to 0° C. and 30 ml of glacial acetic acid was added slowly. After standing for 15 minutes at this temperature, the mixture was poured into 200 ml of cold distilled water. After 30 minutes, the red precipitated solid was filtered and washed with water. The solid was dried overnight in a vacuum desiccator to yield 5.0 g (100%) as a fine red powder. Flash chromatography (50:50 EtOAc:hexane) of I gram of the above solid yielded 650. mg of fairly pure product. Recrystallization from ethanol (190 proof) yielded 540 mg of N-allyl-N-methyl-4-tricyanovinylaniline as fluffy maroon needles. MP=155.0° C.; $\lambda_{max}(CH_2Cl_2)$=514 nm; $\epsilon$=23,835.

EXAMPLE 4

This synthesis procedure includes the preparation of a precursor, N,N-diallylaniline, as well as of the dye.

Aniline (14.6 ml, 0.16 mol) and allyl bromide (35 ml, 0.4 mol) were mixed in a 250 ml round bottomed flask. There was no apparent exotherm. Methanol (70 ml) and pyridine (15 ml) were added to the flask resulting in a vigorous exotherm. The orange red solution was stirred at reflux for 24 hours. The reaction mix was diluted with ethyl acetate and washed sequentially with water (2×50 ml), sodium carbonate (2×50 ml), water (100 ml) and brine (100 ml). After drying over anhydrous magnesium sulfate and filtering, the solution was concentrated to yield 11 g as an orange liquid. TlC showed two products. Flash chromatography (10:90 THF:hexane) yielded 10 g (36%) of pale yellow oil.

Diallyl aniline (4 g, 23.1 mmol) was weighed into a 100 ml round bottomed flask. Pyridine (30 ml) was added and the colorless solution was cooled to 0° C. Tetracyanoethylene (TCNE, 3.25 g, 25.4 mmol) was added in small portions over 15 minutes. The solution immediately turned blue/green and subsequently a deep magenta. After all the TCNE had been added, the red solution was stirred at 0° C. for 35 minutes followed by 48°–55° C. for 20 minutes. After cooling back to 0° C., glacial acetic acid (30 ml) was added slowly with stirring and the solution was stirred for 10 minutes at this temperature before pouring into 200 ml of ice cold water. After sitting in the 0° C. water for 30 minutes, the precipitated solid was filtered and washed with cold water. After drying overnight in a vacuum desiccator, 5.8 g (92%) of a red solid was recovered. Flash chromatography (40:60 THF:hexane) yielded 5 g of a red solid. Recrystallization from ethanol yielded the dye as red needles. MP=93°–94° C.; $\lambda_{max}(CH_22Cl_2)$=512 nm, $\epsilon$=25,567.

EXAMPLE 5

4-Nitroaniline (5.50 g, 0.04 mol) was dissolved in 12 N hydrochloric acid (10.8 ml) and distilled water (7 ml) on a steam bath. The mixture was cooled to 4°–7° C. and 2 M sodium nitrite solution (22 ml) was added over 40 minutes. The mixture was stirred at 5° C. for 1 hour, urea (1.0 g) was added, and the mixture stirred for another 5 minutes. In a separate beaker distilled N,N'-diallyl-3-methylaniline (7.5 g, 40 mmol), sodium acetate (12.0 g), and acetic acid (40 ml) were mixed and cooled to 0°–5° C. The above diazonium solution was added all at once to give a deep red solution. The mixture was stirred vigorously for 1.5 hours at 0°–5° C. and then filtered to give a red solid. The solid was slurried in distilled water (500 ml) and filtered two times. The solid was dried and recrystallized from tetrahydrofuran-ethanol (1:2) two times, (180 ml and 120 ml portions, respectively) to give the dye (8.0 g, 60%, mp 73°–74° C.).

EXAMPLE 6

This synthesis procedure includes the preparation of a precursor, 4-(4-nitrophenylazo)-3-methylaniline, as well as of the dye.

Recrystallized 4-nitroaniline (16.5 g, 0.12 mol) was dissolved in 10 N hydrochloric acid (40 ml) at 75° C. The solution was diluted with water (40 ml), poured over ice (100 g), and cooled in an ice bath. Sodium nitrite solution (64.0 ml, 2 M) was added over 5 minutes and the mixture was stirred for 30 minutes. Urea (1.0 g) was added and the mixture was stirred 20 minutes in an ice bath. In a separate beaker distilled m-toluidine (17.1 g, 0.16 mol) was mixed with 5 N hydrochloric acid (40 ml) for 5 minutes at room temperature and then cooled in an ice bath. The diazonium salt solution was added all at once to the m-toluidine hydrochloride suspension. The mixture was stirred occasionally over 2 hours at 0°–5° C. The mixture was basified with saturated potassium carbonate and the resulting solid was washed twice with warm water. Recrystallization of the solid twice from tetrahydrofuran (90 ml) and ethanol (200 ml) gave 4-(4-nitrophenylazo)-3-methylaniline as red needles (8.32 g, 28%): mp 152° C.

The monoazo nitroamine above (7.68 g, 30 mmol) is worked with 5 N hydrochloric acid (21 ml) with a glass rod until a fine paste forms. The mixture is diluted with water (54 ml), stirred for 5 minutes and 2 M sodium nitrite solution (16.5 ml, 33 mmol) is added over 5 minutes at room temperature. The mixture is stirred 5 minutes at room temperature and cooled to 0°–5° C. In a separate beaker N,N-diallylaniline (7.25 g, 42 mmol) and sodium acetate (7.5 g, 92 mmol) are mixed with glacial acetic acid (51 ml) and water (9 ml) at room temperature and cooled to 0°–5° C. The diazonium salt solution is added all at once at 0°–5° C. and the mixture stirred occasionally over 1 hour. The mixture is basified with saturated potassium carbonate solution and the resulting solid washed twice with warm water. The solid is dissolved in warm tetrahydrofuran (60 ml) and crystallized by addition of absolute ethanol (120 ml) to give the dye.

EXAMPLE 7

This synthesis procedure includes the preparation of a precursor, 4-(N,N-diallylamino)benzaldehyde, as well as of the dye.

A mixture of 4-fluorobenzaldehyde (16.4 ml, 0.15 mol), diallylamine (20.8 ml, 0.17 mol), sodium carbonate (18.0 g, 0.17 mol), hexamethylphosphoramide (HMPA) (115 ml), hydroquinone (180 mg) and tetrahexyl ammonium chloride (200 mg) was heated under a nitrogen atmosphere for 100 hours. The reaction mixture was cooled and poured into distilled water (1 L). Extraction with toluene (4×300 ml) followed by washing of the combined extracts with distilled water (3×250 ml), drying over anhydrous magnesium sulfate, filtration and concentration in vacuo yielded 32 g as a viscous yellow oil. Fractional distillation at 0.8 mm Hg gave 15 g (50%) of 4-(N,N'-diallylamino) benzaldehyde as a pale yellow oil.

In a 25 ml round bottomed flask were added 4-nitrophenylacetic acid (3.6 g, 19.8 mmol) and piperidine (3 ml). 4-(N,N'-diallylamino)benzaldehyde (4.0 g, 19.8mmol) was then added in portions over 15 minutes. When the aldehyde addition was complete, additional piperidine (3 ml) was added and the mixture was stirred at 110° C. for 1 hour and 130° C. for 3.5 hours. The reaction mixture was poured into cold distilled water (200 ml) and extracted with dichloromethane (3×300 ml). The combined extracts were washed with 5 N HCl (2×100 ml), 100 ml 2 N NaOH, 100 ml saturated aqueous sodium carbonate solution and 100 ml brine before drying over magnesium sulfate, filtering and concentrating in vacuo to yield 5.8 g (88%) as a red semi-solid. Recrystallization from methanol yielded 1.8 g of 7 (27%) as bright orange plates: mp 98°–99° C.; $\lambda_{max}(CH_2Cl_2)$=439 nm, $\epsilon$=32,200.

EXAMPLE 8

To a solution of 2-anilinoethanol (Aldrich) (13.7 g, 0.1 mol) in pyridine (50 ml) is added acetic anhydride (33.6 g, 0.33 mol), at room temperature over a period of 30 minutes. The mixture is stirred overnight at room temperature and poured into distilled water (500 ml). The solid is collected and recrystallized from hexane-ethyl acetate to provide N-(2-acyloxyethyl)acetanilide.

The above acetanilide (11.05 g, 0.05 mol) is treated with nitric acid-sulfuric acid mixture and hydrolyzed with 2.5 N hydrochloric acid, in the manner as set forth subsequently herein in Example 11, to provide N-(2-hydroxyethyl)-4-nitrobenzenamine.

N-(2-hydroxyethyl)-4-nitrobenzenamine (9.1 g, 0.05 mol) is treated with allyl bromide in N-methylpyrrolidone, also as subsequently discussed in Example 11, to provide N-allyl-N-(2-hydroxyethyl)-4-nitrobenzenamine.

To a solution of N-allyl-N-(2-hydroxyethyl)-4-nitrobenzenamine (2.22 g, 0.01 mol), triethylamine (1.2 ml) and dichloromethane (20 ml) is added methacryloyl chloride (1.14 g, 11 mmol) with stirring at room temperature. After 3 hours, an additional amount of triethylamine (0.6 ml) and methacryloyl chloride (0.5 g) is added and stirring continued for 3 hours. The mixture is diluted with ethyl ether (100 ml) and washed with water two times, washed with brine, and dried over sodium sulfate. The mixture is concentrated and chromatographed on silica with hexane-ethyl acetate to provide N-allyl-N-(2-methacryloyloxyethyl)-4-nitrobenzenamine.

EXAMPLE 9

2-anilinoethanol (13.7 g, 0.10 mol) is treated with allyl bromide (18.15 g, 0.15 mol), in the manner as set forth in Example 3, to provide N-allyl-N-(2-hydroxyethyl)benzenamine.

N-allyl-N-(2-hydroxyethyl)benzenamine (7.1 g, 0.04 mol) is treated with a solution of p-nitrobenzenediazonium chloride, as discussed in Example 5, to provide N-allyl-N-(2-hydroxyethyl)-4-(4'-nitrophenylazo) benzenamine.

N-allyl-N-(2-hydroxyethyl)-4-(4'-nitrophenylazo)benzenamine (3.26 g, 0.01 mol) is treated with methacryloyl chloride, as discussed in Example 8, to provide N-allyl-N-(2-methacryloyloxyethyl)-4-(4'-nitrophenylazo) benzenamine.

An aspect of this invention pertains to novel dyes for effecting nonlinear optical response. These dyes are generally suitable for incorporation into polymers, and for use in polymer/dye nonlinear optical media, as discussed herein; they are also appropriate for the organosilicon polymers disclosed herein, particularly those of the invention. These novel dyes are characterized by the configuration as previously discussed, i.e., featuring electron donor and acceptor groups linked by a delocalized Pi electron system.

Further, these dyes have at least two carbon-carbon double bonds. Preferably, these are hydrosilation reactive double bonds, also in the manner of the organic dyes as previously discussed.

However, a feature which distinguishes such novel dyes, from those previously discussed, is that the indicated at least two carbon-carbon double bonds—preferably, as indicated, being hydrosilation reactive bonds—are appended to at least two different sites. As used in the context of the novel dyes of the invention, the term "site" refers to the donor group, acceptor group, and available $sp^2$ carbon atoms within the delocalized Pi electron system.

Particularly as to such available $sp^2$ carbon atom sites in the delocalized Pi electron system, it is understood that the delocalized Pi electron system can include none, one, or two or more thereof. Generally as to the at least two different sites of the novel polymers of the invention, it is correspondingly understood that none, a part, or all of such sites can occur within the delocalized Pi electron system.

Also as a matter of preference, the indicated at least two double bonds are divided among at least two pendant groups, and these at least two pendant groups are attached to at least two different sites from among the indicated donor group, acceptor group, and delocalized Pi electron system.

In a particularly preferred configuration, the indicated novel dyes of the invention feature at least two of the indicated hydrosilation reactive carbon-carbon double bonds, appended to two different sites from among the electron donor group, electron acceptor group, and delocalized Pi electron system. Most preferably, the two such different sites are the electron donor group and a site within the delocalized Pi electron system.

For the novel dyes of the invention, a particular advantage can be realized from the indicated placement of the at least two carbon-carbon double bonds. Specifically, because this configuration causes the novel dyes to be bound into the polymer matrix by at least two different sites from among the indicated electron donor group, electron acceptor group, and delocalized Pi electron system, the mobility of these novel dyes in the polymer matrix, at elevated temperatures, can be restricted to a greater degree.

As a result, the dye can be fixed more completely in the polymer matrix, particularly upon second stage cure at elevated temperatures. Correspondingly, improved thermal stability characteristics can be provided to the second order NLO properties of the final optical article.

As discussed elsewhere herein, second order optical non-linearity requires alignment of the polymer dye components. However, entropy factors can adversely affect dye alignment.

For instance, a rise in temperature increases the mobility of polymer dye components. Without corresponding implementation of means for effecting alignment—e.g., an electric field—the result can be a negative influence on dye alignment.

Where the at least two carbon-carbon double bonds are appended to the same site in the dye—e.g., as with the dyes of Examples 2 and 4–7 herein—the reaction of these bonds in the joining of the dye to the polymer, leaves the dye with the capacity for movement—i.e., the ability to rotate. Therefore, upon application of heat, the aligned polymer dye component is more vulnerable to movement out of alignment.

In contrast, novel dyes of the invention, being bound into the polymer at two different sites, are more restricted in their capacity for movement. The greater the restriction, the lower the decrease in the second harmonic signal, upon the application of heat—i.e., the greater the thermal stability.

Further as with those dyes previously discussed herein, the two or more hydrosilation reactive carbon-carbon unsaturated bonds, of the novel dyes of the invention, can be of differing hydrosilation reactivity. These bonds include the particular highly and less hydrosilation reactive carbon-carbon unsaturated bonds which are specified earlier herein.

The novel dyes of the invention include those having the generic formula

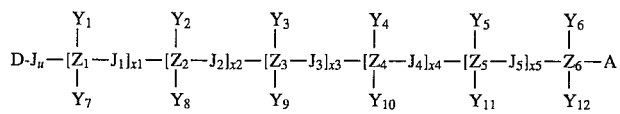

wherein:

$Z_1$ through $Z_6$ are selected from the group consisting of:

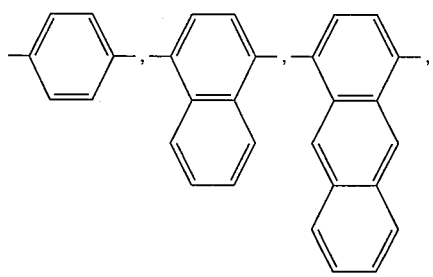

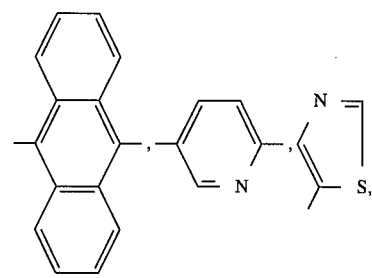

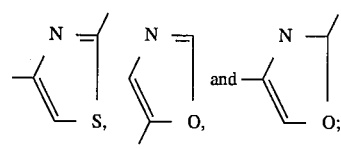

J and $J_1$ through $J_5$ are selected from the group consisting of:
—N=N, —CH=CH—, —CH=N—, and —N=CH—;

A is selected from the group consisting of: —$NO_2$, —CN, —CH=CH—$NO_2$, —CH=CH—CN, —CH=C(CN)2, —C(CN)=C(CN)$_2$, —$SO_2$R, —$CO_2$R, —$SO_3$R, —$CF_3$, and —$SO_2CF_3$;

D is selected from the group consisting of: —N—($Y_{13}$)$Y_{14}$, —O—$Y_{13}$, —S—$Y_{13}$,

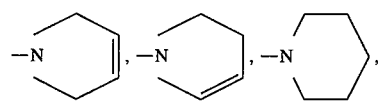

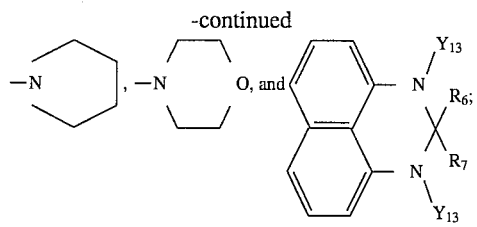

$Y_1$ through $Y_{12}$ are selected from the group consisting of hydrogen, $C_1$–$C_{10}$ alkyl groups, $C_1$–$C_{10}$ alkoxy groups, chlorine, bromine, fluorine, E—$(CH_2)_q$—$Q_w$—, and $CH_2$=C($R_1$)—$CO_2(CH_2)_qQ_w$—;

R, $Y_{13}$ and $Y_{14}$ are selected from the group consisting of $C_1$–$C_{10}$ alkyl groups, E—$(CH_2)_q$—$Q_w$— and $CH_2$=C($R_1$)—$CO_2(CH_2)_q$—$Q_w$—;

E is selected from the group consisting of $R_2$—C($R_3$)=C($R_4$)—, 2-cyclopentenyl, 3-cyclopentenyl, 2-cyclohexenyl, 3-cyclohexenyl and norbornenyl;

Q is selected from the group consisting of —O—, S, —N($R_5$)— and a covalent bond;

$R_1$, $R_2$, $R_3$, $R_4$ and $R_5$ are selected from the group consisting of hydrogen and $C_1$–$C_4$ alkyl groups;

$R_6$ and $R_7$ are selected from the group consisting of hydrogen, $C_1$–$C_{10}$ alkyl groups, cyclic —$(CH_2)_4$— formed by the linkage of $R_6$ and $R_7$, and cyclic —$(CH_2)_5$— formed by the linkage of $R_6$ and $R_7$;

u=0–1;

x1, x2, x3, x4, and x5=0–1;

q=0–10;

m=1–10; and w=0–1;

wherein:

when each of $Y_1$ through $Y_{12}$ is selected from the group consisting of hydrogen, $C_1$–$C_{10}$ alkyl groups, $C_1$–$C_{10}$ alkoxy groups, chlorine, bromine, and fluorine, then A, and one member selected from the group consisting of $Y_{13}$ and $Y_{14}$, must both include hydrosilation reactive carbon-carbon double bonds; and when all but one of $Y_1$ through $Y_{12}$ is selecting from the group consisting of hydrogen, $C_1$–$C_{10}$ alkyl groups, $C_1$–$C_{10}$ alkoxy groups, chlorine, bromine, and fluorine, then one member selected from the group consisting of $Y_{13}$, $Y_{14}$ and A must include a hydrosilation reactive carbon-carbon double bond.

Preferably, for the novel dyes of the indicated generic formula $Z_1$ through $Z_6$ are selected from the group consisting of

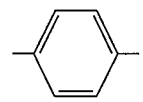

J and $J_1$ through $J_5$ are selected from the group consisting of —N=N—, —CH=CH—, —N=CH—, and —CH=N—;

A is selected from the group consisting of —NO$_2$, —CH=C(CN)$_2$, —C(CN)=C(CN)$_2$, —SO$_2$R, and —CF$_3$;

D is selected from the group consisting of

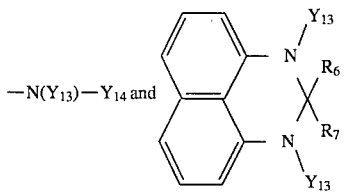

Y$_1$ through Y$_{12}$ are selected from the group consisting of hydrogen, C$_1$–C$_{10}$ alkyl groups, C$_1$–C$_{10}$ alkoxy groups, CH=CH—CH$_2$—, CH=C(CH$_3$)—CH$_2$—, CH$_2$=CHC(=O)O(CH$_2$)$_q$—, and CH$_2$=C(CH$_3$)C(=O)O(CH$_2$)$_q$—, such that all but one of Y through Y$_{12}$ is selected from the group consisting of hydrogen, C$_1$–C$_{10}$ alkyl groups, and C$_1$–C$_{10}$ alkoxy groups;

R, Y$_{13}$ and Y$_{14}$ are as previously defined;

q=2–5; and x1+x2+x3+x4+x5=0–2.

In this application are provided sufficient representative synthesis procedures, for specific novel dyes of the invention, to enable one of ordinary skill in the art generally to prepare such dyes. Particularly, one of ordinary skill in the art, following the teachings set forth herein, would be able to make novel dyes of the invention encompassed within the indicated generic formula.

The indicated particular novel dyes, and their corresponding structures, are shown in Table 2. The synthesis procedures for these dyes are provided thereafter.

TABLE 2

| Example | Dye | Structure |
|---|---|---|
| 10 | N-allyl-N-methly-2-vinyl-4-nitroaniline | |
| 11 | N,N'-diallyl-N,N'-dimethyl-4-nitro-1,3-benzenediamine | |
| 12 | N,N'-diallyl-N,N'-dimethyl-4-(4-nitrophenylazo)-1,3-benzenediamine | |
| 13 | N,2-diallyl-N-methyl-4-[2-(4-nitrophenyl)ethenyl]aniline | |
| 14 | N-allyl-N-methyl-2-(2-acryloyloxyethyl)-4-nitrobenzenamine | |

TABLE 2-continued

| Example | Dye | Structure |
|---|---|---|
| 15 | N-allyl-N-methyl-3-acryloyloxy-4-nitroaniline | |
| 16 | N-methyl-N-allyl-4-(4'-nitrophenylazo)-3-methacryloyloxyaniline | |
| 17 | 2-(2-propenyloxy)-4-(3-pyrrolino)nitrobenzene | |
| 18 | N-methyl-N-allyl-3-(2-cyclopentenyloxy)-4-nitroaniline | |
| 19 | N-methyl-N-allyl-3-(3-butenyloxy)-4-nitroaniline | |
| 20 | N-allyl-N-methyl-3-methacryloyloxy-4-nitroaniline | |

TABLE 2-continued

| Example | Dye | Structure |
|---------|-----|-----------|
| 21 | N,N-diallyl-4-(4'-nitrophenylazo)-3-acryloyloxyaniline | |
| 22 | N-methyl-N-allyl-4-(4'-nitro-3'-methacryloyloxyphenyl azo)aniline | |

EXAMPLE 10

In this synthesis procedure, the dye was prepared by bromination of 2-fluoro-5-nitrotoluene, followed by phosphonium salt formation, condensation with formaldehyde, and displacement of the fluoride with N-methylallylamine.

A solution of 2-fluoro-5-nitrotoluene (18.6 g, 0.12 mol, Aldrich Chemical Co., Milwaukee Wis.) in carbon tetrachloride (26 ml) was heated to reflux and a solution of benzoyl peroxide (1.8 g) dissolved in carbon tetrachloride (54 ml) and N-bromosuccinimide (21.6 g, 0.12 mol) was added in three increments over 1 hour intervals. After a total of 3 hours heating, further benzoyl peroxide (0.6 g) was added and heating continued for 1 hour. The mixture was cooled to room temperature, diluted with ether (100 ml) and filtered to remove succinimide. The filtrate was concentrated, diluted with chloroform (20 ml), and concentrated again and used directly in the next step.

The bromide from the previous step was diluted with chloroform (120 ml). To this solution was added triphenylphosphine (31.5 g, 0.12 mol) at room temperature. The mixture was heated to reflux for 1.5 hours and cooled to room temperature overnight (16 hours). The crystals formed were collected, washed with tetrahydrofuran, and dried to 47.3 g (82.5%) pale yellow crystals. The phosphonium salt was used directly in the next step.

The phosphonium salt from the previous step (47.3 g, 0.0985 mol) was stirred in distilled water (60 ml), tetrahydrofuran (40 ml) and 37% aqueous formaldehyde (30 ml) at room temperature. Sodium carbonate solution (2 M, 75 ml) was added and the two phase solution stirred at room temperature for 1.5 hours. The mixture was diluted with distilled water (300 ml) and extracted with-ether (400 and 150 ml portions). The extracts were washed with distilled water and brine solution, dried over magnesium sulfate, and concentrated to remove most of ether and tetrahydrofuran. Toluene (100 ml) was added and then hexane (200 ml) to precipitate the triphenylphosphine oxide by-product. This byproduct was removed by filtration. The filtrate was concentrated and the remaining oil distilled via Kugelrohr apparatus (55°–85° C., 0.1 mmHg) to give 2-fluoro-5-nitrostyrene as a pale yellow oil (10.3 g, 63%).

The 2-fluoro-5-nitrostyrene (10.3 g, 62 mmol) from the previous step was heated to 60°–65° C. with 1-methyl-2-pyrrolidinone (60 ml), triethylamine (6.0 g, 60 mmol) and N-methylallylamine (8.5 g, 0.12 mol) for 17 hours. The mixture was cooled to room temperature, diluted with distilled water (300 ml) and extracted with ether (300 and 150 ml portions). The extracts were washed with distilled water and brine solution, dried over potassium carbonate and concentrated to a red oil. The oil was chromatographed on silica with hexaneether (20:1) to give 12.7 g oil. Distillation of the oil via Kugelrohr apparatus (100°–110° C., 0.1 mm Hg) gave the dye as an orange-red oil (12.0 g, 89%).

EXAMPLE 11

To a solution of N,N'-dimethyl-1,3-benzenediamine (27.2 g, 0.20 mol) in ethyl ether (300 ml) is added acetic anhydride (44.8 g, 0.44 mol) over 20 minutes at room temperature. The mixture is stirred at room temperature for 2 hours. The solution is diluted with ether (300 ml) and washed with saturated sodium carbonate solution and water, dried over magnesium sulfate,.and concentrated to a solid. The solid is recrystallized from ethyl acetate-hexane to give the pure diacetanilide.

The above diacetanilide (11.0 g, 0.05 mol) is dispersed in concentrated sulfuric acid (16 ml) at room temperature followed by immediate cooling in an ice bath. A 1:1 solution of $HNO_3$:$H_2SO_4$ (3.0 ml 71% nitric acid/2.8 ml 97% sulfuric acid) is added dropwise over 1 hour and the solution is stirred for 3 hours at 0° C. and warmed to 40oC for 1.5 hours. The mixture is poured slowly into water (300 ml) and the mixture is cooled to 0° C. for 1 hour. The solid is collected, washed with water and treated with 2.5 N HCl (75 ml) and ethanol (75 ml) at reflux for 16 hours. The ethanol is removed and the mixture basified to pH=10 with saturated sodium carbonate (100 ml) and extracted three times with ether-dichloromethane (4:1). The extracts are washed with brine, dried over magnesium sulfate, and concentrated. The material is recrystallized from aqueous ethanol to give N,N'-dimethyl-4-nitro-1,3-benzenediamine.

To a solution of N,N'-dimethyl-4-nitro-1,3-benzenediamine (9.05 g, 0.05 mol) in N-methylpyrrolidone (25 ml) is added allyl bromide (18.2 g, 0.15 mol) at room temperature. The mixture is heated to 85°–90° C. for 6 hours and cooled to room temperature. The mixture is diluted with 1 M sodiumcarbonate solution (250 ml) and extracted with ether twice (250 and 150 ml portions). The extracts are washed with water twice, dried over potassium carbonate and concentrated to a solid. The solid is purified by chromatography on silica gel with hexane-ethyl acetate solvent to give the dye.

EXAMPLE 12

N,N'-dimethyl-1,3-benzenediamine (13.6 g, 0.10 mol) is heated to 80° C. in the presence of 2 M sodium carbonate solution (150 ml) and allyl bromide (28.2 g, 0.232 mol) for 6 hours. The mixture is diluted with water and extracted with ether twice (200 and 100 ml portions). The extracts are washed with water and brine, dried over potassium carbonate, and concentrated to an oil. The oil is distilled on a Kugelrohr apparatus to provide pure N,N'-diallyl-N,N'-dimethyl-1,3-benzenediamine.

N,N'-diallyl-N,N'-dimethyl-1,3-benzenediamine (8.64 g, 40 mmol) is coupled with the diazonium salt of 4-nitroaniline, as described in Example 5, to provide the dye.

EXAMPLE 13

To a solution of 2-allylaniline (7.3 g, 54 mmol) in ethyl ether (200 ml) was added acetic anhydride (6.1 g, 60 mmol) at room temperature with stirring. After 45 minutes, the solution was washed with saturated sodiumcarbonate and water, dried over sodium sulfate, and concentrated to a solid. The solid was recrystallized from ethyl acetate-hexane (150 ml, 1:4) to give 2-allyl acetanilide (7.4 g, 77%): mp 93°–94° C.

Potassium hydride suspension (3.7 g, 35 wt %, 32.5 mmol) is weighed into a dry 3-neck flask and washed two times with hexane. The potassium hydride is suspended in dry dimethylformamide (DMF) (50 ml) at room temperature. 2-Allyl acetanilide (5.28 g, 30 mmol) in DMF (50 ml) is added over 15 minutes with mechanical stirring. Stirring is continued for 2 hours at room temperature. Iodomethane (5.0 g, 35 mmol) is added all at once at room temperature and the mixture is stirred for 3 hours. The mixture is diluted with water (500 ml) and 10 N HCl (5 ml), and extracted with ether-dichloromethane (4:1) three times. The extracts are washed with brine, dried over magnesium sulfate and concentrated to an oil. The crude amide is treated with 2.5 N HCl (75 ml) and ethanol (75 ml) at reflux for 16 hours. The ethanol is removed and the mixture basified to pH=10 with saturated sodium carbonate (100 ml) and extracted three times with ether-dichloromethane (4:1). The extracts are washed with brine, dried over magnesium sulfate and concentrated to an oil. The oil is distilled on a Kugelrohr apparatus to give pure 2-allyl-N-methylaniline.

2-Allyl-N-methylaniline (14.7 g, 0.10 mol) is heated to 80° C. in the presence of 2 M sodium carbonate solution (75 ml) and allyl bromide (14.1 g, 0.116 mol) for 6 hours. The mixture is diluted with water and extracted with ether twice (150 and 75 ml portions). The extracts are washed with water and brine, dried over potassium carbonate, and concentrated to an oil. The oil is distilled on a Kugelrohr apparatus to provide pure N,2-diallyl-N-methylaniline.

To dry DMF (25 ml) is added phosphorous oxychloride (15.4 g, 0.10 mol) at 0°–5° C. with mechanical stirring over 0.5 hours. N,2-Diallyl-N-methylaniline (18.7 g, 0.10 mol) in DMF (10 ml) is added in a slow stream with stirring. The mixture is heated to 100° C. with stirring for two hours. The mixture is cooled, poured into ice water (200 ml) and neutralized by slow addition of saturated sodium acetate (150 ml) with stirring. The mixture is extracted with ether two times. The extracts are washed with aqueous saturated sodium bicarbonate (50 ml), water, and then brine solution, dried over potassium carbonate, and concentrated to a solid. The solid is recrystallized from hexane-ethyl acetate to provide pure 3-allyl-4-(N-allyl-N-methylamino) benzaldehyde.

A mixture of 4-nitrobenzylbromide (25.0 g, 0.116 mol), triphenylphosphine (30.4 g, 0.116 mol) and chloroform (120 ml) was refluxed for 2 hours with stirring. The mixture was cooled to room temperature, diluted with THF (250 ml) and cooled in a freezer for 4 hours. The solid was collected and dried under vacuum to give p-nitrobenzyl triphenylphosphonium bromide (54.8 g, 99%).

A mixture of 3-allyl-4-(N-allyl-N-methylamino)benzaldehyde (10.25 g, 0.05 mol), THF (100 ml), p-nitrobenzyl triphenylphosphonium bromide (27.4 g, 0.55 mol) and water (50 ml) is mixed at room temperature while 2 M sodium carbonate solution (50 ml) is added over 5 minutes. The mixture is stirred mechanically for 2 hours. The mixture is diluted with water (300 ml) and extracted two times with ether (250 ml portions). The extracts are washed with water and brine, dried over magnesium sulfate and concentrated. The mixture is diluted with toluene (100 ml) and hexane (200 ml) and the triphenyl phosphine oxide filtered off. The filtrate is concentrated and chromatographed on silica with hexaneethyl acetate to give pure N,2-diallyl-N-methyl-4-[2-(4-nitrophenyl)ethenyl]aniline.

EXAMPLE 14

2-Aminophenethyl alcohol (27.4 g, 0.20 mol) (available from Aldrich Chemical Co., Milwaukee, Wis.) is treated with acetic anhydride (51.0 g, 0.50 mol) in anhydrous pyridine (100 ml) for 2 hours at room temperature. The mixture is poured into ice water and the solid collected, washed with water and dried under vacuum to give 2-(2-acetoxyethyl)acetanilide.

The above acetanilide (11.0 g, 0.05 mol) is dispersed in concentrated sulfuric acid (16 ml) at room temperature followed by immediate cooling in an ice bath. A 1:1 solution of $HNO_3:H_2SO_4$ (3.0 ml 71% nitric acid/2.8 ml 97% sulfuric acid) is added dropwise over 1 hour and the solution is stirred for 3 hours at 0° C. and warmed to 40° C. for 1.5 hours. The mixture is poured slowly into water (300 ml) and the mixture cooled to 0° C. for 1 hour. The solid is collected, washed with water and dried under vacuum. The solid is treated with acetic anhydride (10 g, 0.10 mol) in anhydrous pyridine (25 ml) for 2 hours at room temperature. The mixture is poured into water and the solid is collected, washed with water and dried under vacuum to give 2-(2-acetoxyethyl)-4-nitroacetanilide.

Potassium hydride suspension (3.7 g, 35 wt %, 32.5 mmol) is weighed into a dry 3-neck flask and washed two times with hexane. The potassium hydride is suspended in dry DMF (50 ml) at room temperature. 2-(2-acetoxyethyl)-4-nitroacetanilide (8.0 g, 30 mmol) in DMF (50 ml) is added over 15 minutes with mechanical stirring. Stirring is continued for 0.5 hours at room temperature. Iodomethane (5.0 g, 35 mmol) is added all at once at room temperature and the mixture is stirred for 1 hour. The mixture is diluted with water (500 ml) and 10 N HCl (5 ml), and extracted with ether-dichloromethane (4:1) three times. The extracts are washed with brine, dried over magnesium sulfate and concentrated to an oil. The crude amide is treated with 2.5 N HCl (75 ml) and ethanol (75 ml) at reflux for 16 hours. The ethanol is removed and the mixture basified to pH=10 with saturated sodium carbonate (100 ml) and extracted three times with ether-dichloromethane (4:1). The extracts are washed with brine, dried over magnesium sulfate and concentrated to an oil. The oil is recrystallized from hexane-ethyl acetate to provide pure N-methyl-2-(2-hydroxyethyl)-4-nitrobenzenamine.

To a solution of N-methyl-2-(2-hydroxyethyl)-4-nitrobenzenamine (4.90 g, 0.025 mol) in NMP (15 ml) is added allyl bromide (4.55 g, 0.037 mol) at room temperature. The mixture is heated to 85°–90° C. for 6 hours and cooled to room temperature. The mixture is diluted with 1 M sodium carbonate solution (250 ml) and extracted with ether twice (250 and 150 ml portions). The extracts are washed with water twice, dried over potassium carbonate and concentrated to a solid. The solid is purified by chromatography on silica gel with hexane-tetrahydrofuran solvent to give N-allyl-N-methyl-2-(2-hydroxyethyl)-4-nitrobenzenamine.

To a solution of N-allyl-N-methyl-2-(2-hydroxyethyl)-4-nitrobenzenamine (2.36 g, 10 mmol), triethylamine (1.2 ml) and dichloromethane (20 ml) is added acryloyl chloride (1.0 g, 11 mmol) with stirring at room temperature. After 3 hours, an additional amount of triethylamine (0.6 ml) and acryloyl chloride (0.5 g) is added and stirring continued for 3 hours. The mixture is diluted with ethyl ether (100 ml) and washed with water two times, washed with brine, and dried over sodium sulfate. The mixture is concentrated and chromatographed on silica with hexane-ether to provide the dye.

EXAMPLE 15

To 5-fluoro-2-nitrophenol (10.0 G, 0.064 Mol) in 35 ml of n-methyl-pyrrolidinone under nitrogen was added N-methyl-N-allylamine (7.1 ml, 0.074 mol) in one portion. The solution was heated to 80° C. for 4 hours. After cooling to room temperature, the yellow solution was poured into 200 ml of ice cold distilled water. A yellow solid precipitated from the solution and was filtered, washed with water and dried in a vacuum desiccator overnight. The yield of yellow solid, which was N-allyl-N-methyl-3-hydroxy-4-nitroaniline, was 12.5 g. This material was generally used in subsequent steps without further purification.

To N-allyl-N-methyl-3-hydroxy-4-nitroaniline (5.0 g, 0.024 mol) in dichloromethane (75 ml) were added triethylamine (7 ml) and acryloyl chloride (2.35 ml). The solution was stirred for 3 hours at room temperature and poured into 300 ml of 2.5 N HCl. The organics were extracted with methylene chloride, washed with (in succession) saturated sodium bicarbonate and distilled water, dried over magnesium sulfate, filtered and concentrated to yield 6.0 G of an oily liquid. Flash chromatography (silica gel, 40:60 ethyl acetate:hexane) yielded 5.0 g of the dye as a viscous yellow oil; $\lambda_{max}CH_2Cl_2$=387 nm, $\epsilon$=20,206.

EXAMPLE 16

To 3-(N-methylamino)phenol (10 g, 80 mmol), dissolved in 80 ml of NMP, was added allyl bromide (9.8 ml, 113 mmol) via syringe. The yellow solution was heated to 80° C. for 4 hours. The reaction mixture was poured into distilled water (200 ml) and saturated aqueous sodium bicarbonate solution was added. Extraction with diethyl ether (3×200 ml), drying over anhydrous magnesium sulfate, filtration and concentration in vacuo yielded 18.0 g of 3-(N-allyl-N-methylamino)phenol as a viscous green tinted oil. Vacuum distillation at 1 torr (110°–120° C.) yielded 10.5 g (80%) as a pale yellow oil.

In a small beaker was suspended 3.0 g (21.7 mmol) of p-nitroaniline in 20 ml 5 N HCl and 5 ml of distilled water. The suspension was cooled to 0° C. in an ice bath and 1.6 g of $NaNO_2$ dissolved in 3 ml of distilled water was slowly added via a pipette over 15 minutes while the temperature of the suspension was kept under 4° C. When all the sodium nitrite had been added, the suspension was stirred for an additional 1 hour. In a separate beaker, was combined 10 g sodium acetate, 20 ml of acetic acid and 3.9 g (26.1 mmol) of 3-(N-allyl-N-methylamino) phenol and the beaker was cooled to 0° C. The contents of the first beaker were added to the second beaker slowly with stirring. After 45 minutes, the contents of the beaker were poured into 100 ml of ice water and saturated aqueous sodium bicarbonate solution was added until the foaming stopped. The red solid was filtered, washed with excess distilled water and dried in a vacuum desiccator overnight to yield 6.9 g of N-allyl-N-methyl-4-(4'-nitrophenylazo)-3-hydroxyaniline. Recrystallization from THF/ethanol yielded 3.5 g as maroon needles.

In a previously dried 3-neck round bottomed flask is dissolved 3 g (9.6 mmol) of the N-allyl-N-methyl-4-(4'-nitrophenylazo)-3-hydroxyaniline in 80 ml of dry methylene chloride while under nitrogen. Fresh triethyl amine (3 ml) is added via syringe and the solution is stirred for 5 minutes before adding 1.1 ml (1.1 eq) of methacryloyl chloride dropwise via syringe (about 15 minutes). After stirring 3 hours at room temperature, the contents of the flask are poured into 100 ml of distilled water and extracted several times with ethyl acetate. After washing once with a dilute (50:50) sodium carbonate solution, the combined organic fractions are dried over magnesium sulfate, filtered and concentrated and recrystallized from THF/ethanol to give the dye.

EXAMPLE 17

To 5-fluoro-2-nitrophenol (10 g, 63.6 mmol), which had been dissolved in 100 ml of acetone, was added potassium carbonate (16.6 g, 120 mmol). The pale yellow solution immediately turned bright red in color. Allyl bromide (15.4 g, 11.0 ml, 127 mmol) was added and the stirring was continued at room temperature. A thick red precipitate formed and 2 ml of distilled water was added to help dissolve the phenoxide salt. The round bottomed flask was then fitted with a condenser and the suspension was refluxed under a nitrogen atmosphere for 17 hours. The suspension was cooled to room temperature and 2 N HCl was slowly added with stirring until all the solid had dissolved. The organics were extracted with ethyl acetate, washed with water and saturated aqueous sodium bicarbonate solution. The combined extracts were dried over magnesium sulphate, filtered and concentrated on the rotary evaporator and vacuum line to yield 2-(2-propenyloxy)-4-fluoronitrobenzene as an orange/yellow oil (12.5 g, 100%). This product was used in the next step without further purification.

The 2-(2-propenyloxy)-4-fluoronitrobenzene was dissolved in 20 ml of NMP under a nitrogen blanket. To the pale yellow solution was added 3-pyrroline (1.4 g, 1.5 ml, 19.8 mmol) in one portion. The solution immediately darkened (i.e., to orange/yellow). After 1 hour, the reaction was about 60% complete and after 17 hours, about 95% complete. An additional 150 μl of 3-pyrroline was added to drive the reaction to completion. After a total of 18 hours, the contents of the flask were poured into an ice cold solution of saturated sodium carbonate and water (1:1). A yellow solid precipitated and this solid was filtered, washed with ice cold water and dried in a vacuum desiccator to yield 3.71 g (100%) of yellow crystals. Recrystallization from ethanol yielded 2.7 g (72%) of the dye as fluffy yellow crystals; mp=116°–117.5° C., $\lambda_{max}(CH_2Cl_2)$=465 nm, $\epsilon$=41,833.

EXAMPLE 18

To potassium carbonate (26.4 g, 191 mmol) in 150 ml of acetone was added 5-fluoro-2-nitrophenol (15 g, 95.5 mmol) in one portion. An additional 50 ml of acetone was added and a red suspension quickly formed. The suspension was cooled to 0° C. and crude 3-chlorocyclopentene (12.1 ml, 124 mmol) was added via pipette, this transfer of the 3-chlorocyclopentene being effected with difficulty, because of the viscosity of the solution. The suspension was warmed to room temperature and then refluxed and stirred overnight. In the morning, the suspension (yellow) was cooled to 0° C. and an additional 2–3 ml of the 3-chlorocyclopentene were added. The suspension was again refluxed for several hours. After cooling to room temperature, 2 N HCl was added until the pH was between 3 and 5. The solution was extracted with diethyl ether, washed with water, dried over anhydrous magnesium sulfate, filtered and concentrated to yield 19 g of a brown solid. The solid was dissolved into 250 ml of hexane with heating. A brown/black solid precipitated out of solution and was quickly filtered. The pale yellow filtrate was cooled to 0° C. for several hours and an off white solid was filtered. Drying on the vacuum line, yielded 11.9 g of 2-(2-cyclopentenyloxy)-4-fluoronitrobenzene, as a pale yellow solid; mp=50.5°–51.0° C.

To the 2-(2-cyclopentenyloxy)-4-fluoronitrobenzene (5.0 g, 22.4 mmol) dissolved in 45 ml of N-methylpyrrolidinone (NMP) was added N-methyl allylamine (2.8 ml, 29.1 mmol) in one portion via syringe. The solution was fitted with a reflux condenser and heated with stirring at 60°–70° C. After 18 hours, an additional 400 μl of N-methyl allylamine was added and the reaction was heated an additional 3 hours. The yellow solution was poured into 300 ml of ice cold water. After sitting for 1 hour at 0° C., the yellow precipitated solid was filtered and washed with ice cold water. Drying overnight on a vacuum line yielded 5.6 g (91%) of yellow crystals. The yellow solid was recrystallized from ethyl acetate hexane to give 3.7 g of the dye; mp =80.0°–80.5° C.

EXAMPLE 19

To a suspension of NMP (20 ml), acetone (20 ml) and potassium carbonate (8.85 g) was added 5-fluoro-2-nitro phenol (5.0 g, 30 mmol) in one portion. After 15 minutes, the suspension began to turn yellow. After stirring 30 minutes under nitrogen, 4-bromobutene (4.25 ml) was added and the suspension was refluxed for 18 hours. The suspension was poured into water and extracted with 3×200 ml of diethyl ether. The aqueous layer was acidified with 2 N HCl and extracted with ether. The ether layers were combined, washed with 2 N HCl and water and dried over anhydrous magnesium sulfate. Filtration and in vacuo concentration yielded 6.0 g of 2-(3-butenyloxy-4-fluoronitrobenzene, as an oil, which was used in the next step without further purification.

The 2-(3-butenyloxy-4-fluoronitrobenzene (5.6 g, 26.5 mmol) was dissolved in 60 ml of NMP at room temperature with stirring. N-methyl allyl amine (3.3 ml, 35 mmol) was added in one portion and the yellow solution was warmed to 50°–60° C. for 4 hours. An additional 400 μl of allyl amine was added and the solution was stirred for an additional 16 hours. With the reaction still incomplete, the contents of the flask were poured into 200 ml of ice cold water. The organics were extracted with diethyl ether (3×150 ml), washed with water (3×100 ml), dried over magnesium sulfate, filtered, and concentrated to yield 6.5 g of and orange/yellow oil. Flash chromatography on silica gel (30:70 ethyl acetate:hexane) yielded 5.0 g of yellow/orange oil. A Kugelrohr distillation at 0.2 torr of 3.7 g yielded 3.5 g (68%) of the dye as a bright yellow oil (125°–135° C.); $\lambda_{max}$(ethanol)=388 nm, $\epsilon$=18,020.

EXAMPLE 20

To N-allyl-N-methyl-3-hydroxy-4-nitroaniline (4.0 g, 0.019 mol) in dry methylene chloride (40 ml) were added 4 ml of triethylamine and 2.3 ml of methacryloyl chloride. The solution was stirred for 3 hours at room temperature before pouring into 120 ml of hexane and filtering the resulting white solid. The filtrate was dissolved in methylene chloride, washed, in succession, with saturated aqueous sodium bicarbonate solution and distilled water, dried over magnesium sulfate, filtered, and concentrated to yield 5.0 g of a yellow solid. Recrystallization from ethanol yielded 3.9 g of the dye as yellow needles; mp=91°–92° C.; $\lambda_{max}(CH_2Cl_2)$=387 nm, $\epsilon$=22,612.

EXAMPLE 21

To 3-Aminophenol (10.0 g, 0.092 mol), dissolved, in a flask, in NMP (150 ml), were added 60 ml of triethylamine and 19 ml of allyl bromide. The mixture was stirred under nitrogen at 80° C. Over a 48 hour period, an additional 22 ml of triethyl amine and 9 ml of allyl bromide were added to the flask. After cooling to room temperature, the reaction mixture was poured into 500 ml of distilled water, extracted with diethyl ether, washed with distilled water, dried over magnesium sulfate, filtered and concentrated to yield 13.5 g of 3-(N,N-diallylamino)phenol, as a red oil. Flash chromatography (silica gel, 30:70 THF:hexane) yielded 11.3 g of 3-(N,N-diallylamino)phenol as a pale yellow oil.

In a small beaker was suspended 3.0 g (21.7 mmol) of p-nitro aniline in 24 ml 5 N HCl and 6 ml of distilled water. The suspension was cooled to 0° C. in an ice bath and 1.6 g of NaNO$_2$ dissolved in 5 ml of water was slowly added via a pipette over 15 minutes while the temperature of the suspension was kept under 4° C. When all the sodium nitrite had been added, the suspension was stirred for an additional 1 hour. In a separate beaker were combined 12 g sodium acetate, 24 ml of acetic acid and 4.5 g of the 3-(N,N-diallylamino)phenol, and the beaker was cooled to ca. 0° C. The contents of the first beaker were added to the second beaker slowly with stirring. After 2 hours, the mixture was poured into 100 ml of ice water and saturated aqueous sodium bicarbonate solution was added until the foaming stopped. The red solid was filtered, washed with excess distilled water and dried in a vacuum desiccator overnight to yield 6.4 g of N,N-diallyl-4-(4'-nitrophenylazo)-3-hydroxyaniline.

In a previously dried 3-neck round bottomed flask was dissolved 6 g of the N,N-diallyl-4-(4'-nitrophenylazo)-3-hydroxyaniline in 140 ml of dry methylene chloride while under nitrogen. Fresh triethyl amine (5.1 ml) was added via syringe and the solution was stirred for 5 minutes before adding 1.6 ml (1.1 eq) of acryloyl chloride dropwise via syringe (about 15 minutes). After 2 hours, an additional 500 μl of triethylamine and 800 μl of acryloyl chloride were added to the solution and the contents were stirred an additional 1 hour. The contents of the flask were poured into 200 ml of distilled water and extracted several times with ethyl acetate/THF. After washing once with a dilute (50:50) sodium carbonate solution, the combined organic fractions were dried over magnesium sulfate, filtered and concentrated on the rotary evaporator and vacuum line to yield 7.0 g as a viscous semisolid. Recrystallization from ethyl acetate/hexane yielded 3 g of the dye, as fluffy maroon needles.

EXAMPLE 22

In a beaker is dissolved 300 mg (1.95 mmol) of recrystallized 5-amino-2-nitrophenol in 2 ml 5 N HCl and 1 ml of THF, and the solution is cooled to 0° C. In a separate beaker are combined 2 g sodium acetate, 4 ml of acetic acid and 287 mg (1.95 mmol) of N-methyl-N-allylaniline and the resulting suspension is cooled to as near 0° C. as possible. $NaNO_2$ (140 mg) dissolved in 1 ml of water is added to the first beaker dropwise over 15 minutes while keeping the temperature of the solution below 0° C. When all the sodium nitrite has been added, the solution is stirred for 10 minutes and the contents of the first beaker are added to the second beaker slowly with stirring. After 30 minutes, the contents of the flask are poured into 30 ml of ice water and saturated aqueous sodium bicarbonate solution is added until the foaming stops. The organics are extracted with ethyl acetate, washed with sodium bicarbonate solution, dried over magnesium sulfate, filtered and concentrated to yield 600 mg of N-methyl-N-allyl-4-(4'-nitro-3'-hydroxyphenylazo) aniline, as a dark red viscous oil.

In a previously dried 3-neck round bottomed flask is dissolved 500 mg (1.6 mmol) of the N-methyl-N-allyl-4-(4'-nitro-3'-hydroxyphenylazo) aniline in 20 ml of dry methylene chloride while under nitrogen. Fresh triethyl amine (0.5 ml) is added via syringe and the solution is stirred for 5 minutes before adding 183 μl (1.1 eq) of methacryloyl chloride dropwise via syringe (about 15 minutes). After stirring 3 hours at room temperature, the contents of the flask are poured into 100 ml of distilled water and extracted several times with ethyl acetate. After washing once with a dilute (50:50) sodium carbonate solution, the combined, organic fractions are dried over magnesium sulfate, filtered and concentrated, and recrystallized from THF/ethanol to give the dye.

4. Polyenes

The polyenes suitable for the polymers of the invention have at least two hydrosilation reactive carbon-carbon double bonds. As discussed with reference to the organic dyes, two or more polyenes can be used in combination.

The polyenes can serve as crosslinking components in the polymers of the invention, in the manner of the organic dyes having at least two hydrosilation reactive carbon-carbon double bonds. The interrelation of components in forming polymers of the invention is further discussed, elsewhere herein.

Appropriate polyenes include cyclic polysiloxane polyenes, linear polysiloxane polyenes, unsaturated polyester polyenes, polyether polyenes, unsaturated organic rubbers, and low molecular weight polyenes (typically having molecular weights less than 1000 and preferably less than 500), all with at least two hydrosilation reactive carbon-carbon double bonds per molecule.

Suitable cyclic polysiloxane polyenes include those disclosed in the following patents: LAMOREAUX '432, U.S. Pat. No. 3,197,432, including the olefinic tetramers disclosed therein; LAMOREAUX '433, U.S. Pat. No. 3,197,433, including the tetrafunctional cyclotetrasiloxanes and difunctional cyclotetrasiloxanes disclosed therein; and WATANABE et al., U.S. Pat. No. 4,640,968; these patents are incorporated herein in their entireties, by reference thereto. Specific examples are tetramethyltetravinylcyclotetrasiloxane, tetramethyltetraal lylcyclotetrasiloxane, hexamethyldi (ethylidenenorbornyl)cyclotetrasiloxane, hexamethyldi (methylidenenorbornyl) cyclotetrasiloxane, tetravinyl-1,5-dimethyl-3,7-diphenylcyclotetrasiloxane, hexamethyldivinylcyclotetrasiloxane, and 1,5-divinyl-1,5-diphenyl-3,3,7,7-tetramethylcyclotetrasiloxane.

Useful linear polysiloxane polyenes are, for example, 1,1,3,3-tetramethyl-1,3-di(ethylidenenorbornyl)disiloxane, 1,1,3,3-tetramethyl-1,3-divinyldisiloxane, 1,1,3,3-tetramethyl-1,3-diallyldisiloxane, polymethylvinylsiloxane, 1,3-dimethyl-1,3-diphenyl-1,3-divinyldisiloxane and polymethylphenylvinylsiloxane.

Useful low molecular weight polyenes include the polyfunctional methacrylates, acrylates, vinyls, allyls, isopropenyls, isobutenyls, and norbornenyls. Specific examples are o-, m-, and p-divinylbenzene, o-, m-, and p-diisopropenylbenzene, diallyl ether, o-, m-, and p-diallyl benzene, 1,4- and 1,5-hexadiene, 5-vinyl-2-norbornene, 5-ethylidene-2-norbornene, bisphenol A diallyl ether, bisphenol A dimethacrylate and diacrylate, 1,4-pentadiene, and 1,5-cyclooctadiene. Also useful are the monomers with two or more terminal norbornenyl groups, as disclosed in BARD etal. '360.

Preferred polyenes suitable for the polymers of the invention include the fused polycyclic polyenes; two or more such polyenes can be used in combination. Among the fused polycyclic polyenes which may be employed are those as disclosed in LEIBFRIED '779 and LEIBFRIED '731.

Particular such fused polycyclic polyenes are polycyclic hydrocarbon compounds having at least two non-aromatic hydrosilation reactive carbon-carbon double bonds in their rings. Exemplary compounds include bicycloheptadiene (i.e., norbornadiene), and its Dieis-Alder oligomers with cyclopentadiene (e.g., dimethanohexahydronaphthalene), norbornadiene dimer, hexahydroanthracene, and substituted derivatives of any of these. As indicated above for polyenes generally, two or more fused polycyclic polyenes, in particular, can be used in combination.

As with the previously discussed dyes, the at least two non-aromatic hydrosilation reactive carbon-carbon double bonds of these fused polycyclic polyenes can be of differing hydrosilation reactivity. Of these, the more hydrosilation reactive bonds include those that are next to two bridgehead positions in a fused polycyclic aliphatic ring structure. The less hydrosilation reactive carbon-carbon double bond(s) may be any other non-aromatic carbon-carbon double bond that is not next to two bridgehead positions in a fused polycyclic aliphatic ring structure, e.g., the cyclopentene ring double bond in dicyclopentadiene (DCPD). Illustrative are certain isomers of cyclopentadiene oligomers having the general formula:

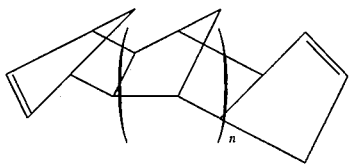

wherein n is 0, 1, 2, or 3 and substituted derivatives of these (substituents should not substantially interfere with the reactivity of the carbon-carbon double bonds in hydrosilation and, preferably, should not be on the carbon atoms of the double bonds); exemplary such compounds include methyl dicyclopentadiene, DCPD, and tricyclopentadiene. Preferred are DCPD and tricyclopentadiene, with DCPD being most preferred.

Further as to the fused polycyclic polyene component, use of one or more fused polycyclic polyenes having at least two non-aromatic hydrosilation reactive carbon-carbon double bonds of the same or similar reactivity, in combination with one or more polycyclic polyenes having such bonds with differing hydrosilation reactivity, is also within the scope of the invention.

5. Polymers

The polymers of the invention include organosilicon crosslinked polymers and crosslinkable prepolymers. Further, they include hydrosilation products of the indicated cyclic polysiloxane, organic dye, and, optionally, polyene, and, as discussed previously herein, they can include one or more of each of these components.

If polyene is not present, the dye must have at least two hydrosilation reactive carbon-carbon double bonds; where polyene is included, then dyes with only one such double bond are also appropriate. The polymers of the invention specifically include those having both one or more organic dyes, each with one or more hydrosilation reactive carbon-carbon double bonds, and one or more of the polyenes.

Preferably, for the organosilicon polymers of the invention, and for the fully formulated prepolymers of the invention, the ratio of (a) total hydrosilation reactive carbon-carbon double bonds contributed by the dye, or by the dye and polyene together, to (b) total hydrosilation reactive ≡SiH groups contributed by the cyclic polysiloxane, is about 0.02:1 to about 4.0:1, or about 0.3:1 to about 2:1; more preferably, this ratio is about 0.5:1 to about 1.8:1. Still more preferably, this ratio is about 0.7:1 to about 1.3:1; most preferably, it is about 0.8:1 to about 1.2:1. When polyene is present, the amount of hydrosilation reactive carbon-carbon double bonds contributed thereby is such that the ratio of hydrosilation reactive carbon-carbon double bonds contributed by the dye, to the indicated total hydrosilation reactive ≡SiH groups, is about 0.01:1 to about 3.9:1, more preferably about 0.1;i to 2:1, and, most preferably, this ratio is about 0.2:1 to 1:1.

The previously discussed hydrosilation reaction results in residues of cyclic polysiloxane alternating with residues of organic dye, or also of polyene, if the latter is also present. If the hydrosilation reaction is sufficiently continued, these alternating residues form a crosslinked polymer.

One such crosslinked, thermoset polymer of the invention is the reaction product of two moles of tetramethyl cyclotetrasiloxane, three moles of N,N'-diallyl-4-nitroaniline, and one mole of norbornadiene. The fully cured, thermoset polymer obtained from these reactants has the following idealized structural formula (this formula only depicts the 2,6 norbornane isomer, whereas the 2,5 isomer can also be present):

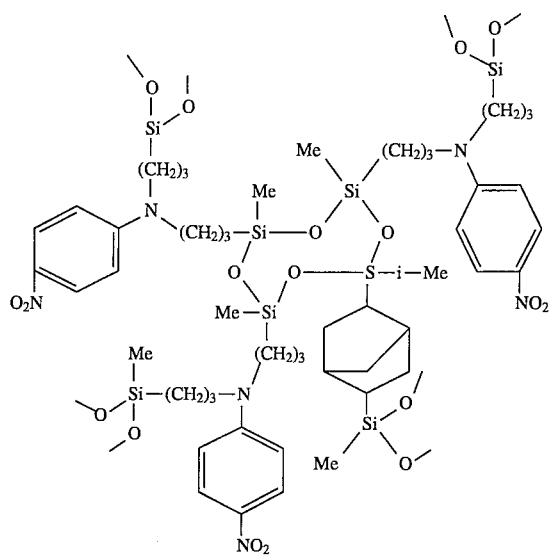

The organosilicon prepolymers and polymers of the invention can be prepared utilizing the procedures and components, including, but not limited to, process steps and catalysts, as set forth in LEIBFRIED '779, LEIBFRIED '731, and BARD et al. '360, and in BURNIER, U.S. Pat. No. 5,025,048, LEIBFRIED '134, U.S. Pat. No. 5,077,134, and BARD et al. '303, U.S. Pat. No. 5,068,303, and U.S. application Ser. Nos. 593,161, filed Oct. 5, 1990, 593,167, filed Oct. 5, 1990, 593,168, filed Oct. 5, 1990, and 685,360, filed Apr. 15, 1991; BURNIER, LEIBFRIED '134, and BARD et al. '303, and these applications, are incorporated herein in their entireties, by reference thereto. The reactions for forming the prepolymer and for forming a polymer from the prepolymer can be promoted thermally, or by the addition of a hydrosilation catalyst or radical generators such as peroxides and azo compounds. The hydrosilation catalysts include metal salts and complexes of Group VIII elements. The preferred hydrosilation catalysts contain platinum (e.g., $PtCl_2$, dibenzonitrile platinum dichloride, platinum on carbon, etc.).

One such platinum catalyst is chloroplatinic acid ($H_2PtCl_6 \cdot 6H_2O$); also appropriate are the platinum complex of divinyltetramethyldisiloxane (available as PCO72 from Huls America), and the platinum-containing catalysts PCO75 and PCO85 (available from Huls America). One preferred catalyst is a complex of chloroplatinic acid and dicyclopentadiene, as disclosed in BARD et al. '360.

The amount of catalyst used can vary widely, and will readily be determinable by one of ordinary skill in the art. Generally, catalyst concentrations of between about 0.0005% to about 0.5% by weight of platinum, based on the weight of the reactants, are preferred, and will effect smooth and substantially complete polymerization.

A suitable solvent, or combination of solvents, is generally employed in preparation of the polymers of the invention. The solvent serves to bring the dye component into solution, and also acts as a vehicle for coating the prepolymer of the invention onto a substrate.

Generally, any solvent, particularly organic solvent, which will bring the reaction components into solution, and is also compatible with the hydrosilation catalyst, is appropriate. Preferred such solvents include toluene, benzene, the xylenes, chlorobenzene, chloroform, dichloromethane, tetrahydrofuran, dioxane, ethanol, and acetonitrile.

The amount of solvent employed is generally not critical, and, as with the catalyst, can vary over a wide range.

Usually, solvent will be used in the proper proportion to bring the dye component into solution, and/or to effect the coating operation; suitable amounts are readily determinable by those of ordinary skill in the art.

To prepare the polymers of the invention, several approaches are available. It is within the scope of the invention simply to prepare the crosslinked polymer, without obtaining the prepolymer as a separate, prior step. As one means of accomplishing this result, the correct relative ratios of reactants and the catalyst are simply mixed, with a suitable solvent, and brought to a temperature at which the reaction is initiated; proper temperature conditions are thereafter maintained to drive the reaction to substantial completion.

However, these polymers are most commonly used to provide nonlinearly optically active films for optical articles. Accordingly, they are generally prepared initially in the form of prepolymers; these prepolymers are recovered, and coated on substrates, particularly in the form of thin films. Then, crosslinking is completed, to obtain thermoset articles, by means of a final curing step.

The following method is one which is particularly appropriate when the reactants include hydrosilation reactive carbon-carbon double bonds of differing hydrosilation reactivity. Suitable proportions of cyclic polysiloxane, dye, and optionally, polyene, are mixed in a solvent. Catalyst is then added, and the mixture is heated to a relatively low reaction temperature—preferably, about 25° to about 110° C.

The reaction is slowed when the viscosity of the solution increases. The resulting initial product of this low temperature reaction is a soluble liquid prepolymer, even where the ratio of hydrosilation reactive carbon-carbon double bonds to ≡SiH groups is otherwise suitable for crosslinking.

The degree of hydrosilation is thusly limited, to achieve the desired prepolymer, because of the low temperature at which the reaction is conducted. Under such conditions, it is predominantly the more hydrosilation reactive of the carbon-carbon double bonds—i.e., such as those provided by pendant alkyl chains, especially the terminal olefin chains, and by fused bicycloalkenyl groups—which react. The less reactive of these bonds—i.e., such as the cyclopentenyl double bond of DCPD—are predominantly left unreacted within the indicated 25°–110° C. range. Accordingly, appropriate choice of the dye and, optionally, polyene components, to provide the requisite combination of greater and less hydrosilation reactive carbon-carbon double bonds, will allow the reaction to be effected so that selected sites undergo hydrosilation in the initial preparation of prepolymer, with other selected sites being left unreacted for the final thermosetting cure.

A combination of cyclic polysiloxane and dye with which this low temperature synthesis may be conducted is tetramethylcyclotetrasiloxane (TMCTS) and N-allyl-N-methyl-2-vinyl-4-nitroaniline. Mixture of these-two compounds in solvent, and reaction at 65° C., results in a soluble prepolymer wherein substantially all of the dye allyl groups have been hydrosilated; subsequent heating, at elevated temperatures, effects hydrosilation of the less reactive styryl carbon-carbon double bonds, and thereby transforms the prepolymer into a thermoset polymer.

A combination of cyclic polysiloxane, dye, and polycyclic polyene with which this low temperature synthesis may be conducted is N,N-diallyl-4-nitroaniline, TMCTS, and DCPD, in the weight proportion of 63:100:72. Mixing and reacting in the manner discussed above, but at room temperature, also result in a prepolymer. In this instance, the more reactive double bonds which have undergone hydrosilation are those from the dye allyl groups, and also the 2,3-bicyclic double bonds of DCPD. Further heating of the prepolymer effects hydrosilation of the less reactive cyclopentenyl double bonds of DCPD, thereby providing the thermoset polymer.

With reference to the slowing of the previously discussed low temperature reaction, one means of accomplishing this objective is by cooling the reaction mixture to a lower temperature. In addition, or in the alternative, a catalyst inhibitor may be added, after such initial reaction of the more hydrosilation reactive carbon-carbon double bonds, to slow further hydrosilation.

Suitable inhibitors include the phosphites and the phosphines, and the aliphatic diamines, triamines, and tetramines, and the monohydrogen derivatives of unsaturated aliphatic 1,4-dicarboxylic acids, as disclosed in MELANCON, U.S. Pat. No. 4,504,645, and the benzothiazole derivatives, as disclosed in SATO etal., U.S. Pat. No. 4,011,247; these patents are incorporated herein in their entireties, by reference thereto.

More particularly as to the aliphatic amines, useful such inhibitors include the alkyl diamines and triamines. These include those having the formulae:

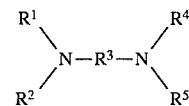

and

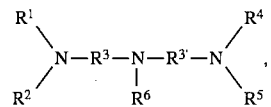

wherein $R^1$, $R^2$, $R^4$, $R^5$ and $R^6$ each represent a hydrogen or an alkyl radical having 1 or 2 carbon atoms. In the case where $R^2$ and $R^4$ are alkyl radicals having 2 carbon atoms, it is preferred that $R^1$ and $R^5$ be hydrogen. $R^3$ and $R^{3'}$ represent an alkene radical containing from 1 to 4 carbon atoms. Preferably both $R^3$ and $R^{3'}$ are ethylene. Reaction rate modifiers which meet these criteria include, but are not limited to, ethylenediamine, N,N'-dimethylethylenediamine, N,N'-diethylethylenediamine, N,N,N',N'-tetramethylethylenediamine (TMEDA), and diethylenetriamine (DETA). Higher order alkylamines, such as alkyl tetraamines and alkyl pentaamines, will function in a similar manner.

Additional inhibitors which are suitable include tributylphosphite, triphenylphosphite, tributylphosphine, triphenylphosphine, 1,2-bis(diphenylphosphino)ethane, tetraethylethylenediamine, octyl hydrogen maleate, and benzothiazole. Of the specified inhibitors, those which are preferred are tributylphosphite, 1,2-bis(diphenylphosphino)ethane, diethylenetriamine, and tetramethylethylenediamine.

Stabilizers (anti-oxidants) are useful to maintain storage stability of the prepolymers, and thermal oxidative stability of final polymers. Preferred are bis(1,2,2,6,6-pentamethyl-4-piperidinyl)-(3,5-di-tert-butyl-4-hydroxybenzyl) butylpropanedioate (available as Tinuvin™ 144 from Ciba-Geigy Corp., Hawthorne, N.Y.), or a combination of octadecyl 3,5-di-tert-butyl-4-hydroxyhydrocinnamate (also known as octadecyl 3-(3',5'-di-tert-butyl-4'-hydroxyphenyl) propionate) (available as Naugard™ 76 from Uniroyal Chemical Co., Middlebury, Conn.) and bis(1,2,2,6,6-pentamethyl-4-piperidinylsebacate) (available as Tinuvin™ 765 from CibaGeigy Corp.). Stabilizers are generally used in an amount of about 0.5% to about 3.0%, based on the weight of the polymer or prepolymer of the invention. Generally, the stabilizers can be employed as disclosed in BURNIER,. and in U.S. application Ser. No. 593,167.

Aside from such utilization of low reaction temperature and differing hydrosilation activity, controlling the reaction to prevent complete crosslinking, and thereby provide a distinguishable prepolymer, can also be effected by manipulation of reactant proportions.

In one method using this technique, the amount of cyclic polysiloxane, organic dye, and, optionally, polyene provided to the reaction mixture is such that the ratio of (a) total hydrosilation reactive non-aromatic carbon-carbon double bonds to (b) hydrosilation reactive ≡SiH groups from said reactants is about 1:1 to 10:1. Prepolymers prepared in this manner can, at the appropriate time, be mixed with sufficient additional amounts of cyclic polysiloxane so that the indicated ratio is lowered to a range of about 0.02:1 to about 4.0:1, or about 0.3:1 to about 2:1, or about 0.5:1 to about 1.8:1, or about 0.7:1 to about 1.3:1, or, most preferably, about 0.8:1 to about 1.2:1, and heated to form a thermoset polymer.

In a similar approach, the mixture of cyclic polysiloxane, organic dye, and, optionally, polyene in the reaction mixture can be such that the ratio of (a) to (b) is about 0.1:1 to about 1:1. The additional reactant or reactants used with the resulting prepolymer in this method are organic dye, or polyene, or both organic dye and polyene, provided in a sufficient amount so that the ratio of (a) to (b) is adjusted, again to a range as previously indicated, with additional heating to provide the thermoset polymer.

In both of these methods, when polyene is employed in addition to the organic dye, the amount of hydrosilation reactive carbon-carbon double bonds contributed thereby is such that the ratio of hydrosilation reactive carbon-carbon double bonds contributed by the dye, to the indicated total hydrosilation reactive ≡SiH groups, is about 0.01:1 to about 3.9:1, more preferably about 0.1:1 to 2:1; and, most preferably, this ratio is about 0.2:1 to 1:1.

Further in both of these methods, the reaction control necessary to prevent completion of crosslinking results from the absence of sufficient hydrosilation reactive carbon-carbon double bonds (in the first method) and ≡SiH groups (in the second method) for such curing to be obtained. As previously indicated, the final curing is generally conducted after the prepolymer has been coated on a substrate.

It is often preferred to add additional catalyst to the prepolymer formulation before final curing. Accordingly, when the optical article is to be prepared, the necessary additional reactant (depending on which of the two methods has been used) and additional catalyst are added to the previously prepared prepolymer to give a fully formulated prepolymer. The fully formulated prepolymer is then applied to the substrate, and heat is applied to complete the crosslinking.

6. Coating and Alignment

It is emphasized that the invention is not limited to those particular methods of effecting crosslinking with the prepolymer-coated substrate, as discussed above, but, rather, generally encompasses optical articles having one or more surfaces partially or fully coated with the crosslinked polymer of the invention, regardless of how coating and crosslinking are achieved. Preparation of the optical article includes, as well as such crosslinking, treatment of the organosilicon polymer film component, to impart second order nonlinear optical activity thereto. The relation of these two steps is discussed herein.

Further as to obtaining the prepolymer-coated substrate itself, several specific techniques are suitable for providing appropriate films-particularly, polymeric thin films. These techniques include dip coating of the polymer in solution, spin casting of polymer solution, and Langmuir-Blodgett deposition procedures.

Organosilicon prepolymer films of the invention are formed by spin casting onto a variety of substrates, depending upon the specific article desired. In this technique, the fully formulated prepolymer is added to a suitable amount of carrier solvent, such as toluene, benzene, a xylene, chloroform, dichloromethane, tetrahydrofuran, chlorobenzene, dioxane, or ethanol, sufficient to dissolve the prepolymer, usually at about 1 to 50 wt % solids. This solution is applied onto a substrate, e.g., glass, or semiconductor wafers.

With respect to the optical activity of the polymer films of the invention, such films must be non-centrosymmetric to have second order nonlinear optical response or activity; however, thin polymer films are generally centrosymmetric, and therefore exhibit no second order nonlinear response—i.e., their second order optical nonlinearity is zero. Accordingly, if such films are to have utility for second order nonlinear optical applications, such as second harmonic generation and the linear electro-optic effect, there must be sufficient alignment of the nonlinearly optically active moieties thereof —i.e., as to the polymers of this invention, the organic dye. components—to make the polymers non-centrosymmetric.

In this regard, it is noted that a centrosymmetric polymer material will exhibit third order nonlinear optical activity, and is therefore potentially useful for third order nonlinear optical applications, such as third harmonic generation, self-focusing and defocusing, and the quadratic electro-optic effect. However, the third order nonlinear optical response is enhanced by making the polymeric material non-centrosymmetric.

Any suitable method may be used to align the organic dye components, of the polymers of the invention, to provide the desired non-centrosymmetry. Appropriate techniques are generally applied to such polymers in the form of films, particularly thin films.

For instance, alignment can be imparted in the coating process itself, e.g., by using Langmuir-Blodgett techniques; in this manner, the aligned material is built-up a monolayer—i.e., a layer one molecule thick—at a time. However, such a process is suitable only where the molecular structure of the nonlinearly active moieties—i.e., the organic dyes—is compatible with Lanqmuir-Blodgett techniques; further, because a final film thickness on the order of one micrometer is what is generally desired, the process is time consuming in any event.

Alignment of the nonlinear active moieties can also be effected by exposing the polymer film to an electric field. In such instance, the ground state dipole moment of these active moieties couples to the applied electric field, and, as a result, they rotate to align their dipole moment with the electric field.

If a significant fraction of such organic dye substituents have enough freedom to rotate, the polymeric film of which they are a part is made non-centrosymmetric, and therefore has second order nonlinear optical activity. Factors determining the proportion of organic dye substituents which become thusly aligned include the composition of the polymer, the magnitude of the ground state dipole moment of its active moieties, the temperature at which the alignment process is conducted, the magnitude of the electric field which is applied, and the time for which the polymeric film is exposed to the electric field.

It is generally not sufficient merely to achieve alignment of the polymeric organic dye substituents. For most second order nonlinear optical applications, these active moieties must remain aligned once the electric field is removed.

Therefore, it is preferred that the rotatability of these groups be subject to control by process conditions. For instance, it is particularly advantageous if such dyes can rotate freely during the early stages of treatment—e.g., while alignment is being implemented—but, after non-centrosymmetry is achieved—e.g., toward the end of the process for preparing the optical medium or article—the dyes no longer can rotate.

One method of achieving this desired result is to raise the temperature of the polymeric thin film close to or above its glass transition temperature where the mobility of the polymer is substantially increased; an electric field is applied subsequently, and the polymer is cooled slowly to room temperature. The decreased mobility at room temperature aids in maintaining the non-centrosymmetric state when the electric field is removed.

Various factors affect the ability of the polymer film to maintain non-centrosymmetry—i.e., alignment of the nonlinearly optically active moieties—after the electric field is removed. These factors include the relationship of the ambient operating temperature to the glass transition temperature, the amount of free volume surrounding the active moieties, and the number of active moiety bonding sites in the polymer.

As to using an electric field to impart second order nonlinear optical activity to polymers—including those of the invention, and particularly in the form of films—those methods currently used fall into one of two categories—contact poling, and corona poling.

To effect contact poling, conductive electrodes are placed onto the polymeric material, and a voltage is applied. The magnitude of the resulting electric field is determined by the magnitude of such voltage, the conductivity of the polymer, and the degree of separation between the electrodes.

Electric fields achieved by this means of poling are generally on the order of 1 megavolt per centimeter, before the polymeric material experiences dielectric breakdown. Further, this upper limit is often reduced by defects present in the film, because the conductive electrodes allow the current density to increase in the vicinity of such defects, resulting in dielectric breakdown at lower electric field strengths.

Corona poling was developed to overcome the indicated limitations of contact poling. Typically, in this method, a high voltage is placed onto a conductor, such as a wire, needle, or wire mesh, in close proximity to a ground plane. The high electric field which is created near the conductor ionizes the surrounding gas, and the resulting ions migrate toward the ground plane.

If a polymer thin film is introduced between the ground plane and the conductor, such ions will be deposited thereupon. The magnitude of the electric field generated across the polymer film will be affected by factors including the conductivity of the polymer, the distance from the top of the polymer thin film to the ground plane, the type of gas used to generate the ions, the pressure of the gas, and the number of ions generated.

With such corona poling, the ions on the polymer are the source of the electric field, and the polymer has a low conductivity; therefore, higher electric fields before breakdown are possible than can be obtained from contact poling. Another advantage of corona poling over contact poling is that the deposition of conductive electrodes is unnecessary for the former.

However, a drawback to corona poling is that it can damage the polymer thin film surface, and inject ions into the polymer. As a result, a temporary photochromic shift may be created. In addition, a non-uniformelectric field across the polymer may be generated.

As previously indicated in preparation of the optical articles of the invention, substrates are generally coated with prepolymers of the invention; accordingly, both crosslinking, as well as treatment to impart second order nonlinear optical activity, are required.

As to this matter, the film may be precured, by heating to some extent, then subjected to poling, depending upon the optimal curing schedule for the composition at issue; where such precuring is employed, the curing step is completed after the poling step. Another suitable approach is to increase—either gradually, or stepwise—the strength of the poling field, while increasing the curing temperature. It is emphasized, however, that the invention is not limited to these particular methods and combinations, or to the specific products resulting therefrom, but encompasses all methods which provide the requisite films, coated substrates, and optical articles, and further generally encompasses these films, coated substrates, and articles, however obtained.

The second order nonlinear optical properties, of the non-centrosymmetric organosilicon polymer films of the invention, are characterized by the magnitude of these films' optical nonlinearity. Specifically, second harmonic generation (SHG) is used to determine the magnitude of the second-order nonlinearity at high frequencies (about $10^{14}$–$10^{15}$ Hz).

SHG experiments measure the efficiency of a second-order nonlinear optical material to convert light at one wavelength (fundamental) to light at half the wavelength (second-harmonic) as a function of fundamental polarization, second-harmonic polarization, and input angle of the light beam. Theoretical fits to the experimental data give the magnitude of the second-order nonlinearity at high frequencies. The methods used to perform SHG measurements are thoroughly discussed in "Applied Classical Electrodynamics, Volume II: Nonlinear Optics," F. A. Hopf and G. I. Stegeman, Wiley Interscience, N.Y. (1986), which is incorporated herein in its entirety, by reference thereto.

Preferred values for the second order nonlinear optical susceptibility, $X^{(2)}$, are greater than 0.25 picometers/volt.

The optical articles of the invention—i.e., comprising substrates bearing the crosslinked organosilicon polymer films of the invention, whether centrosymmetric or non-centrosymmetric—are suitable for incorporation into a wide variety of optical devices. These include all manner of optical light switches and light modulator devices, optical harmonic generating devices, including second harmonic generators, channel waveguide electro-optical directional couplers, laser frequency converters, optical Kerr effect devices, degenerate four wave mixing devices, optical interferometric waveguide gates, wide-band electrooptical guided wave analog-to-digital converters, all-optical multiplexers, all-optical demultiplexers, optical bistable devices, and optical parametric devices. Means for incorporating the optical articles of the invention, into such devices, are known, or can readily be ascertained, by those of ordinary skill in the art.

The following are particular Examples of the polymers of the invention, and of synthesis procedures for their preparation.

For the procedures set forth in these Examples, the TMCTS and pentamethylcyclopentasiloxane (PMCPS) were obtained from Huls America, and purified by distillation. The solvents used were HPLC grade solvents, obtained from Aldrich Chemical Company Inc., Milwaukee, Wis. The catalyst solution was prepared from the platinum catalyst PC072 (platinum-divinyltetramethyldisiloxane complex, 3–3.5 wt percent platinum), by ten-fold dilution thereof with toluene. The DCPD was obtained from Maruzen Petrochemical Company, Ltd., Tokyo, Japan. The antioxidant solution was prepared utilizing a 4:1 ratio of Naugard™ 76 and Tinuvin™ 765, as a 50% solution in toluene.

For the reactant's used in each of Examples 23–31, the ratio of hydrosilation reactive C=C bonds to ≡SiH groups was 1:1.

EXAMPLE 23

This Example illustrates the preparation of a crosslinked polymer of the invention, utilizing the dye of Example 1, and DCPD.

Into a 25 ml flask were added TMCTS (0.60 g, 10.0 milliequivalents of ≡SiH groups), N-allyl-N-methyl-4-nitroaniline (0.67 g, 3.5 milliequivalents of C=C bonds), toluene (0.74 g) and antioxidant solution (0.04 g, 2.25% of total eventual weight of solids). The flask, with a reflux condenser and a magnetic stirrer fitted thereto and in operation, was purged with nitrogen for 10 minutes while warming in a 65° C. oil bath. After warming to 65° C., the flow of nitrogen was stopped, and the catalyst solution (25 microliters, 50 ppm Pt relative to the total weight of solids) was added. After 4.5 hours., the solution was cooled to room temperature, and DCPD (0.43 g, 6.5 milliequivalents of C=C bonds), and an additional amount of catalyst solution (33 microliters, 50 ppm Pt relative to solids) was added. The hydrosilation of the DCPD was allowed to proceed overnight at room temperature.

The resulting prepolymer in solution was spin coated onto a substrate, and cured at 190° C. for 5 hours, to produce a crosslinked organosilicon polymer.

EXAMPLE 24

This Example illustrates the preparation of a polymer of the invention, utilizing a dye with two hydrosilation reactive double bonds—i.e., the dye of Example 2—TMCTS, and, as a further comonomer added at the beginning of the reaction, DCPD.

Into a small serum bottle were measured DCPD (0.92 g, 14.0 milliequivalents C=C bonds), N,N-diallyl-4-nitroaniline (0.65 g, 6.0 milliequivalents C=C. bonds), TMCTS (1.20 g, 20.0 milliequivalents ≡SiH groups), tetrahydrofuran (0.70 g), and antioxidant solution (0.06 g, 2.25% of the total solids). The solution was then purged with nitrogen for 10 minutes. After purging, the catalyst solution (109 microliters, 100 ppm Pt) was added, and the reaction mixture stirred at room temperature for one day, to obtain a prepolymer in solution. Final curing of the prepolymer was accomplished at 190° C. for 5 hours.

EXAMPLE 25

This Example illustrates the preparation of a crosslinked polymer of the invention, also utilizing the dye of Example 2 and TMCTS, but, in this instance, without the added presence of a polycyclic polyene.

N,N-diallyl-4-nitroaniline (0.33 g, 3.0 milliequivalents C=C bonds) was placed into a 25 ml round bottom flask along with TMCTS (0.18 g, 3.0 milliequivalents ≡SiH groups), toluene (0.51 g), and antioxidant solution (0.01 g). The flask, with a reflux condenser and magnetic stirrer fitted thereto and in operation, was placed into a 65° C. oil bath. After purging with nitrogen for 10 minutes, the catalyst solution (20 microliters, 100 ppm Pt) was added, and the reaction proceeded for 45 minutes. The resulting prepolymer in solution was coated on a substrate, and cured at 190 ° C. for 3 hours.

EXAMPLE 26

This Example illustrates the preparation of a crosslinked polymer of the invention, utilizing an azo dye—i.e., the dye of Example 5—and TMCTS, with DCPD subsequently added, and a second stage of the polymerization reaction then conducted.

A 25 ml round bottom flask was charged with TMCTS (0.48 g, 8.0 milliequivalents ≡SiH groups), N,N-diallyl-4-(4'-nitrophenylazo)-3-methylaniline (0.47 g, 2.8 milliequivalents C=C bonds), toluene (0.33 g) and antioxidant solution (0.03 g). The flask, with a reflux condenser fitted thereto and in operation, was purged with nitrogen for 10 minutes, while warming to 65° C. The catalyst solution (25 microliters, 50 ppm Pt) was added, and the reaction progressed for 4.5 hours. The flask was removed from the heat, DCPD (0.34 g, 5.2 milliequivalents C=C bonds) and an additional 25 microliters of catalyst solution were then added, and a second stage of the reaction was initiated. This second stage of the reaction was continued at room temperature for 24 hours, to obtain a prepolymer in solution. This prepolymer solution was coated on a substrate, and cured at 170° C. for 3 hours.

EXAMPLE 27

This Example illustrates the preparation of a crosslinked polymer of the invention, utilizing a stilbene dye—i.e., the dye of Example 7—and TMCTS, with DCPD subsequently added, and a second stage of the polymerization then conducted.

Into a 25 ml round bottom flask were added TMCTS (0.36 g, 6.0 milliequivalents ≡SiH groups), 4-(N,N-diallylamino)-4'-nitrostilbene (0.34 g, 2.1 milliequivalents C=C bonds), toluene (0.41 g), and antioxidant solution (0.02 g). The flask, with a reflux condenser and a stirrer fitted thereto and in operation, was warmed at 65° C. while purging with nitrogen. After purging for one hour, the catalyst solution (14 microliters, 50 ppm Pt) was added and the reaction proceeded for 4.5 hours. The flask was then cooled to room temperature, and DCPD (0.26 g, 3.9 milliequivalents C=C bonds), and an additional 19 microliters of catalyst solution, were added. The reaction was then allowed to continue for 5 days at room temperature. The resulting prepolymer in solution was coated on a substrate, and cured at 190° C. for 5 hours.

EXAMPLE 28

This Example illustrates the preparation of a crosslinked polymer of the invention, utilizing TMCTS and a tricyanovinyl dye—i.e., the dye of Example 4—without polycyclic polyene.

A 25 ml round bottom flask was charged with TMCTS (0.15 g, 2.5 milliequivalents ≡SiH groups), N,N-diallyl-4-tricyanovinylaniline (0.34 g, 2.5 milliequivalents C=C bonds), toluene (0.50 g), and antioxidant solution (0.01 g). The flask, with a reflux condenser and a stirrer fitted thereto and in operation, was warmed to 110° C. while purging with nitrogen. After 20 minutes of purging, the flow of inert gas was stopped, and catalyst solution (19 microliters) was added. The reaction mixture was stirred at 110° C. for 4 hours. The resulting prepolymer in solution was coated on a substrate, and cured at 190° C. for 5 hours.

EXAMPLE 29

This Example illustrates the preparation of a crosslinked polymer of the invention, utilizing a novel dye of the invention wherein the two C=C bonds are of differing hydrosilation reactivity—i.e., the dye of Example 10—and TMCTS.

Into a 25 ml flask were added TMCTS (0.48 g, 8.0 milliequivalents ≡SiH groups), N-allyl-N-methyl-2-vinyl-4-nitroaniline (0.87 g, 8.0 milliequivalents C=C bonds), 0.34 g tetrahydrofuran, and 0.03 g of the antioxidant solution. The flask, with a reflux condenser and a stirrer fitted thereto and in operation, was stirred under nitrogen for 10 minutes, then warmed to 65° C. Then, 27 microliters of catalyst solution were added (50 ppm Pt). Final curing of the resulting prepolymer in solution was accomplished by the addition of 25 microliters of the catalyst solution, and heating to 190° C. for 3 hours.

EXAMPLE 30

This Example illustrates the preparation of a crosslinked polymer of the invention, utilizing TMCTS and one of the novel dyes of the invention—i.e., the dye of Example 20.

N-allyl-N-methyl-3-methacryloyloxy-4-nitroaniline (0.34 g, 2.5 milliequivalents of C=C bonds) was placed into a 25 ml round bottom flask along with 0.15 g TMCTS (2.5 milliequivalents ≡SiH groups), 1.00 g toluene, and 0.01 g of antioxidant solution. The flask, with a reflux condenser and a magnetic stirrer fitted thereto and in operation, was placed into a 75° C. oil bath. After purging with nitrogen for 5 minutes, 19 microliters (100 ppm Pt) of catalyst solution was added, and the reaction proceeded for 3.5 hours. The resulting prepolymer in solution was cured at 170° C. for 5 hours.

EXAMPLE 31

This Example illustrates the preparation of a crosslinked polymer of the invention, utilizing the dye of Example 2 and a ten-membered siloxane ring cyclic polysiloxane—i.e., PMCPS.

N,N-diallyl-4-nitroaniline (0.33 g, 3.0 milliequivalents C=C bonds) was placed into a 25 ml round bottom flask along with PMCPS (0.18 g, 3.0 milliequivalents ≡SiH groups), toluene (0.52 g) and 0.01 g of antioxidant solution. The flask, with a reflux condenser and a magnetic stirrer fitted thereto and in operation, was placed into a 65° C. oil bath. After purging with nitrogen for 5 minutes, 20 microliters (100 ppm Pt) of catalyst solution was added, and the reaction proceeded for 1.75 hours. The resulting prepolymer in solution was cured at 190° C. for 3 hours.

The following Examples illustrate the second order harmonic properties, of dyes in particular polymers of the invention, from the previous Examples. The following treatment procedures apply to the subsequent Examples, except where stated to the contrary.

For each such Example, the polymer solution identified therein was weighed, and sufficient toluene was added thereto to obtain a 20 wt percent solution. An additional 25 microliters of the catalyst solution was then added.

A thin film of the polymer solution was then spun at 2000 rpm, using a Headway Spinner, Model No. EC101D, Garland, Tex., onto a soda glass substrate, 0.1 cm thick, 1.5 cm wide, and 2 cm long, obtained from HOYA Electronics Corp., Woodcliff Lake, N.J. The polymer thin film was subsequently cured in an oven at 130° C. for 1 hour and 190° C. for 3 hours. The thickness of the polymer thin film was then measured, using a Tencor Alpha-Stepper, Model No. 10-0030, Mountain View, Calif.

The thin film-coated glass substrate was placed into a corona poling apparatus. The configuration of the particular apparatus used in these procedures is described below.

Specifically, this apparatus comprises a plexiglass enclosure, purged with nitrogen gas. Inside the enclosure is a heated, grounded aluminum plate, the temperature thereof being monitored by a Chromalox temperature controller (Model #3910-51108, Lavergne, Tenn.). Embedded in the aluminum plate is copper tubing, which aids in cooling the plate down from elevated temperatures. One centimeter above the grounded aluminumplate is a 50 micrometer tungsten wire, obtained from Kimbal Physics, Catalog No. W-WI-005-3M, Wilton, N.H., running parallel to the plane of the aluminum plate. The tungsten wire is attached via a 10 megohm resistance to a high voltage power supply—Model No. 410B, obtained from Fluke, Seattle, Wash.—outside of the enclosure.

In the operation of this apparatus, the current between the tungsten wire and grounded aluminum plate is monitored during the corona poling process. The sample being poled is placed in thermal contact with the aluminum plate, and symmetrically positioned under the tungsten wire. The effective poling area is along the length of the tungsten wire, and 1 centimeter to either side of the wire for the described geometry.

In the corona poling process, the temperature of the heated aluminum plate and, thus, the sample, was raised to 130° C. At 130° C. the voltage on the power supply was adjusted to give 40 microamperes current. The indicated temperature and current were maintained for 1.5 hours.

Then, with the corona current being maintained at the indicated level, the sample was cooled to room temperature, by passing cooled nitrogen gas through the copper tubing in the aluminum plate, for approximately 0.5 hours. The corona voltage was then reduced to zero, and the sample was removed from the corona poling apparatus.

The characterization of the second-order optical nonlinearity was performed using second-harmonic generation. A Nd:YAG laser—Model No. GCR-4, obtained from Spectra-Physics, Mountain View, Calif., and having a wavelength at 532 nanometers—was used to pump a dye laser—Model No. FL3002, obtained from Lambda Physik, Goettingen, West Germany. Light at 585 nanometers from the dye laser, and light at 1064 nanometers from the Nd:YAG laser, were difference frequency mixed, in a potassium dihydrogen phosphate crystal, to give light at 1300 nanometers. The 1300 nanometer light was focussed onto the corona-poled sample, and the light generated at 650 nanometers (second-harmonic generation) was measured using a photomultiplier tube detector.

For such operations, the second-harmonic signal is measured as a function of 1300 nanometer and 650 nanometer light polarization, and the incident angle of the 1300 nanometer light onto the sample. The magnitude of the sample second-harmonic signal is compared to the signal generated by a y-cut lithium niobate crystal. Since the nonlinear optical coefficients ($X^{(2)}_{ijk}$) of lithium niobate are well known, the magnitude of the sample nonlinear optical coefficients can be determined from this comparison.

The only nonlinear coefficient of the sample (poled using this geometry) to be non-zero and uniquely determined by the second-harmonic generation process is $d_{31}$ (=0.5.$X^{(2)}_{311}$). This requires the 1300 nanometer light be polarized along the axis of rotation of the sample and perpendicular to the poling axis. The 650 nanometer light will exit the sample polarized perpendicular to the 1300 nanometer polarization and along the poling axis of the sample.

The data was collected by a Compaq Deskpro 286 computer as a function of input angle for the sample and the lithium niobate reference. The lithium niobate reference is set up to give a second-harmonic signal, due to the nonlinear coefficient $d_{33}$=30 picometers/volt.

EXAMPLE 32

A prepolymer in solution was prepared as provided in Example 26, but with the dye of Example 2, rather than that of Example 5. The treatment procedures as previously set forth herein were then effected; the thickness of the polymer thin film was measured to be 0.7 micrometers, and the nonlinear coefficient, $d_{31}$, of the poled sample was determined to be 0.9 picometers/volt.

EXAMPLE 33

A prepolymer in solution was prepared as provided in Example 26, but with the dye of Example 4, rather than that of Example 5. The treatment procedures as previously set forth herein were then effected, except that sufficient toluene was added to obtain a 30 wt percent solution.

The thickness of the polymer thin film was measured to be 0.47 micrometers, and a slight discoloration of the polymer directly under the corona wire was detected. The nonlinear coefficient, $d_{31}$, was determined to be 6.1 picometers/volt.

EXAMPLE 34

A prepolymer in solution was prepared as provided in Example 26, but with the dye of Example 7, rather than that of Example 5. The treatment procedures as previously set forth herein were then effected. The thickness of the polymer film was measured to be 0.5 micrometers, and a slight discoloration of the polymer directly under the corona wire was detected. The nonlinear coefficient, $d_{31}$, was determined to be 2.8 picometers/volt.

EXAMPLE 35

A prepolymer in solution was prepared as provided in Example 24, but with the dye of Example 5, rather than that of Example 2. The treatment procedures as previously set forth herein were then effected, except for the differences as set forth below.

Specifically, the curing of the polymer thin film was conducted only at 130° C. for one hour, without the subsequent heating at 190° C. for 3 hours; the thickness of the thin polymer film was measured at 0.55 micrometers. Further, the corona poling was effected according to the following parameters.

The heated aluminum plate and sample temperature was raised to 130° C., and the voltage on the power supply was adjusted to give 20 microamperes current, with these values being maintained for 0.5 hours. The temperature and corona current were then increased to 150° C. and 30 microamperes, and maintained for 0.5 hours. The temperature and corona current were increased yet again, to 170° C. and 40 microamperes, and maintained at these levels for 0.5 hours.

The cooling and current maintenance was conducted in the manner as set forth in the indicated treatment procedures. Three-quarters of the sample clouded up and discolored. The optical characterization was performed just outside the damaged region of the sample. The nonlinear coefficient, $d_{31}$, was determined to be 6.8 picometers/volt.

Examples 36 and 37, in particular, demonstrate the second order harmonic properties of polymers of the invention characterized by increased chromophore loading.

EXAMPLE 36

A prepolymer in solution was prepared as provided in Example 25, but with the dye of Example 5, rather than that of Example 2. The curing and corona poling were effected according to the parameters as set forth in Example 35.

The thickness of the thin polymer film was measured at 0.3 micrometers. One-third of the sample clouded up and discolored; the optical characterization was performed just outside the damaged region of the sample. The nonlinear coefficient, $d_{31}$, was determined to be 21 picometers/volt.

EXAMPLE 37

A prepolymer in solution was prepared as provided in Example 25, but with the dye of Example 4, rather than that of Example 2. The curing and corona poling were effected according to the parameters as set forth in Example 35.

The thickness of the thin polymer film was measured at 0.48 micrometers. The entire sample clouded up and discolored; the optical characterization was performed at the center of the sample. The nonlinear coefficient, $d_{31}$, was determined to be 5.5 picometers/volt.

EXAMPLE 38

A prepolymer in solution was prepared as provided in Example 30. The treatment procedures as previously set forth herein were then effected, except for the differences as set forth below.

Specifically, in the dilution of the prepolymer solution, the amount of toluene added was sufficient to obtain a 30 wt percent solution, and the additional amount of catalyst solution added thereafter was 15 microliters; further, the curing of the polymer thin film was conducted in the manner as provided in Example 35—i.e., by heating at 130° C. for one hour, without the subsequent heating at 190° C. for 3 hours. The thickness of the thin polymer film was measured at 0.5 micrometers.

As for corona poling, the voltage on the power supply was adjusted to give 10 microamperes current, which was maintained for 5 minutes. The temperature was then raised to 60° C., with the current being maintained at 10 microamperes.

Upon reaching 60° C., the temperature was maintained at this level for 5 minutes. Then, with current being maintained at 10 microamperes, the temperature was raised to 95° C., then to 135° C., being kept at each level for 5 minutes.

With the current still being maintained at 10 microamperes, the sample was cooled in the manner as set forth in the treatment procedures; the entire sample clouded up, and the optical characterization was performed at the center thereof. The nonlinear coefficient, $d_{31}$, was determined to be 2.4 picometers/volt.

Finally, although the invention has, as has been noted above, been described with reference to particular means, materials and embodiments, it should be noted that the invention is not limited to the particulars disclosed, and extends to all equivalents within the scope of the claims.

What is claimed is:

1. A medium exhibiting second order nonlinear optical susceptibility, $X^{(2)}$, of greater than 0.25 picometers/volt, said medium comprising an organosilicon crosslinked polymer which is the hydrosilation reaction product of reactants comprising the following:
   (a) at least one cyclic polysiloxane having at least two hydrosilation reactive ≡SiH groups; and
   (b) at least one organic dye having:
      (i) an absorption maximum between 300 and 2000 nm;
      (ii) an extinction coefficient, at the absorption maximum, greater than $2 \times 10^3$ L/mol cm; and
      (iii) at least two hydrosilation reactive carbon-carbon double bonds;
   wherein at least one of said at least one cyclic polysiloxane and said at least one organic dye has more than two hydrosilation reactive sites; and
   wherein said organosilicon crosslinked polymer is characterized by sufficient organic dye alignment to exhibit said second order nonlinear optical susceptibility.

2. An optical article comprising:
   (a) a substrate; and
   (b) a film coating said substrate, said film comprising the medium of claim 1.

3. A process for preparing the optical article of claim 2, comprising:
   (a) coating said optical substrate with an organosilicon crosslinkable prepolymer comprising:
      (i) at least one polysiloxane having at least two hydrosilation reactive ≡SiH groups; and
      (ii) at least one organic dye having:
         (A) an absorption maximum between 300 and 2000 nm;
         (B) an extinction coefficient, at the absorption maximum, greater than $2 \times 10^3$ L/mol cm; and
         (C) at least two hydrosilation reactive carbon-carbon double bonds;
      wherein at least one of said at least one cyclic polysiloxane and said at least one organic dye has more than two hydrosilation reactive sites; and
      wherein 5% to 80% of the hydrosilation reactive ≡SiH groups of said at least one cyclic polysiloxane are prereacted; and
   (b) curing said organosilicon crosslinkable prepolymer, to form an organosilicon crosslinked polymer, and imparting sufficient organic dye alignment to said organosilicon crosslinkable prepolymer, or to said organosilicon crosslinked polymer, to effect said second order nonlinear optical susceptibility.

* * * * *

UNITED STATES PATENT AND TRADEMARK OFFICE
CERTIFICATE OF CORRECTION

PATENT NO. : 5,605,726
DATED : Feb. 25, 1997
INVENTOR(S) : Wayne Gibbons, et al

It is certified that error appears in the above-indentified patent and that said Letters Patent is hereby corrected as shown below:

Col. 3, line 21, delete "moleties" and insert -- moieties --;

Col. 5, line 45, delete ".its" and insert -- its --;

Col. 5, line 45, after "point" insert -- at --;

Col. 5, line 47, after "5%" insert -- to --;

Col. 5, line 49, after "refer" insert -- to --;

Col. 6, at space for line 20, remove erroneous formula and insert --

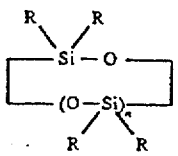

UNITED STATES PATENT AND TRADEMARK OFFICE
CERTIFICATE OF CORRECTION

PATENT NO. : 5,605,726
DATED : Feb. 25, 1997
INVENTOR(S) : Wayne Gibbons, et al

It is certified that error appears in the above-indentified patent and that said Letters Patent is hereby corrected as shown below:

Col. 6, line 51, delete "Pa." and insert -- PA --;

Col. 6, line 60, delete "moleties" and insert -- moities --;

Col. 17, in spaces for lines 25 - 45, delete erroneous formula and insert --

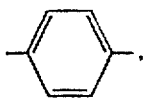

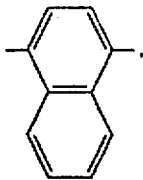

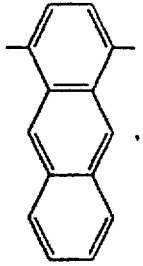

UNITED STATES PATENT AND TRADEMARK OFFICE
CERTIFICATE OF CORRECTION

PATENT NO. : 5,605,726

DATED : Feb. 25, 1997

INVENTOR(S) : Wayne Gibbons, et al

Page 3 of 6

It is certified that error appears in the above-indentified patent and that said Letters Patent is hereby corrected as shown below:

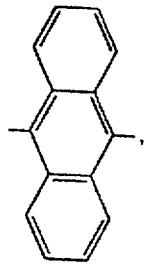

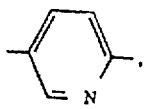

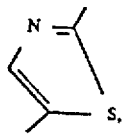

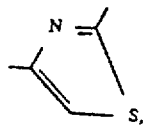

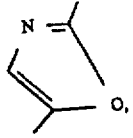

and

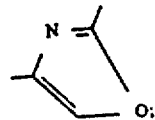

UNITED STATES PATENT AND TRADEMARK OFFICE
CERTIFICATE OF CORRECTION

PATENT NO. : 5,605,726
DATED : Feb. 25, 1997
INVENTOR(S) : Wayne Gibbons, et al

It is certified that error appears in the above-indentified patent and that said Letters Patent is hereby corrected as shown below:

Col. 24, line 52, delete ".and" and insert -- and --;

Col. 24, line 60, delete "40oC" and insert -- 40° C --;

Col. 25, line 9, delete "sodiumcarbonate" and insert -- sodium carbonate --;

Col. 32, line 16, delete "tetramethyltetraal lylcyclotetrasiloxane" and insert -- tetramethyltetraallylcyclotetrasiloxane --;

Col. 32, line 49, delete "Dieis" and insert -- Diels --;

Col. 33, line 5, delete the formula, insert therefore --

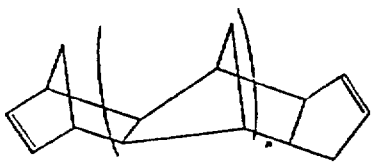

Col. 33, line 53, delete "0.1;i" and insert -- 0.1:1 --;

UNITED STATES PATENT AND TRADEMARK OFFICE
CERTIFICATE OF CORRECTION

PATENT NO. : 5,605,726
DATED : Feb. 25, 1997
INVENTOR(S) : Wayne Gibbons, et al

It is certified that error appears in the above-indentified patent and that said Letters Patent is hereby corrected as shown below:

Col. 34, Lines 5 - 20, delete the formula and insert therefore --

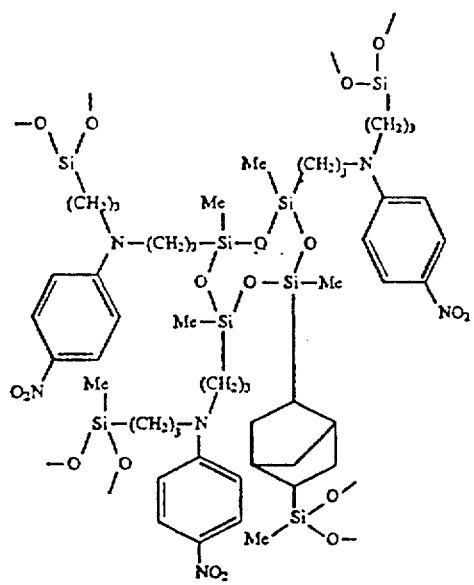

UNITED STATES PATENT AND TRADEMARK OFFICE
CERTIFICATE OF CORRECTION

PATENT NO. : 5,605,726
DATED : Feb. 25, 1997
INVENTOR(S) : Wayne Gibbons, et al

It is certified that error appears in the above-indentified patent and that said Letters Patent is hereby corrected as shown below:

Col. 38, line 24, delete "dye." and insert -- dye --;

Col. 38, line 49, delete "moleties" and insert -- moieties --;

Col. 40, line 2, delete "non-uniformelectric" and insert -- non-uniform electric --;

Col. 46, line 4, delete "Just" and insert -- just --;

Signed and Sealed this

Twenty-first Day of July, 1998

Attest:

BRUCE LEHMAN

*Attesting Officer*  *Commissioner of Patents and Trademarks*